(12) United States Patent
Tobita et al.

(10) Patent No.: US 7,930,339 B2
(45) Date of Patent: Apr. 19, 2011

(54) TASK ALLOCATION METHOD AND TASK ALLOCATION APPARATUS

(75) Inventors: Takao Tobita, Tokyo (JP); Seiji Murata, Chiba (JP); Akihito Nagata, Tokyo (JP); Wataru Kaneko, Tokyo (JP); Kenichi Murata, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 745 days.

(21) Appl. No.: 11/559,458

(22) Filed: Nov. 14, 2006

(65) Prior Publication Data

US 2007/0110094 A1    May 17, 2007

(30) Foreign Application Priority Data

Nov. 15, 2005 (JP) .................. 2005-330887

(51) Int. Cl.
*G06F 9/46* (2006.01)
(52) U.S. Cl. .................. 709/202; 718/100; 709/221
(58) Field of Classification Search .................. 709/221; 718/100
See application file for complete search history.

(56) References Cited

U.S. PATENT DOCUMENTS

| | | | | |
|---|---|---|---|---|
| 5,980,093 A * | 11/1999 | Jones et al. | ........................ | 716/5 |
| 6,385,636 B1 * | 5/2002 | Suzuki | ........................... | 718/105 |
| 6,430,594 B1 | 8/2002 | Akiyama | | |
| 6,633,942 B1 * | 10/2003 | Balasubramanian | ......... | 710/264 |
| 6,948,172 B1 * | 9/2005 | D'Souza | ........................ | 718/106 |
| 2002/0124012 A1 * | 9/2002 | Liem et al. | .................... | 707/200 |
| 2003/0135621 A1 * | 7/2003 | Romagnoli | .................... | 709/226 |
| 2003/0140172 A1 * | 7/2003 | Woods et al. | .................. | 709/248 |
| 2005/0141023 A1 * | 6/2005 | Yagita et al. | .................. | 358/1.15 |

FOREIGN PATENT DOCUMENTS

| | | |
|---|---|---|
| JP | 05-250338 A | 9/1993 |
| JP | 10228385 A | 8/1998 |
| JP | 2001166816 A | 6/2001 |

OTHER PUBLICATIONS

Jon Quarfoth, Task Allocation Algorithms With Communication Costs Considered, 2005, University of Minnesota, p. 6-7 (as attached).*
Robert T. Futrell; Donald F. Shafer; Linda I. Safer, Quality Software Project Management, Jan. 24, 2002, Prentice Hall, pp. 1-11 (as attached).*

(Continued)

*Primary Examiner* — Ashok B Patel
*Assistant Examiner* — Andrew Goldberg
(74) *Attorney, Agent, or Firm* — Matthew B. Dernier, Esq.; Gibson & Dernier LLP

(57) ABSTRACT

A distributed processing system includes plural nodes each provided with a processor and communicably connected to each other. A task information obtaining unit obtains antecedent dependency between tasks. A node information obtaining unit obtains a time constraint imposed on the tasks. A start time computing unit computes an absolute earliest start time at which a task can be started and an absolute latest start time allowed in order to complete the task within the time constraint, by referring to the time constraint. A node selector selects a destination node to which a target task not yet allocated to a node should be allocated, by referring to the absolute earliest start time and the absolute latest start time. A task placement unit causes the task to be executed in the selected node.

12 Claims, 27 Drawing Sheets

OTHER PUBLICATIONS

European Search Report for Corresponding European Application No. 06255820.0.

Yu-Kwong Kwok et al: "Static scheduling algorithms for allocating directed task graphs to multiprocessors" ACM Computing Surveys ACM USA, vol. 31, No. 4, Dec. 1999, pp. 406-471.

Yu-Kwong Kwok et al: "Dynamic critical-path scheduling: an effective technique for allocating task graphs to multiprocessors" IEEE Transactions on Parallel and Distributed Systems IEEE USA, vol. 7, No. 5, May 1996, pp. 506-521.

Wu M-Y et al: "Hypertool: a programing aid for message-passing systems" IEEE Transactions on parallel and Distributed Systems USA, vol. 1. No. 3, Jul. 1990, pp. 330-343.

Yu-Kwong Kwok, Ishfaq Ahmad: "Benchmarking and Comparison of the Task Graph Scheduling Algorithms" Journal of Parallel and Distributed Computing Mar. 17, 1999.

Chinese Office Action for corresponding Chinese Application No. 200610160369.4, Nov. 20, 2009.

Yu-Kwong Kwok et al: "Static Scheduling Algorithms for allocating Directed Task Graphs to Multiprocessors" ACM Computing Surveys, vol. 31, No. 4, Dec. 1999.

Office Action for corresponding Japanese Application No. 2005-330887, dated Aug. 24, 2010.

* cited by examiner

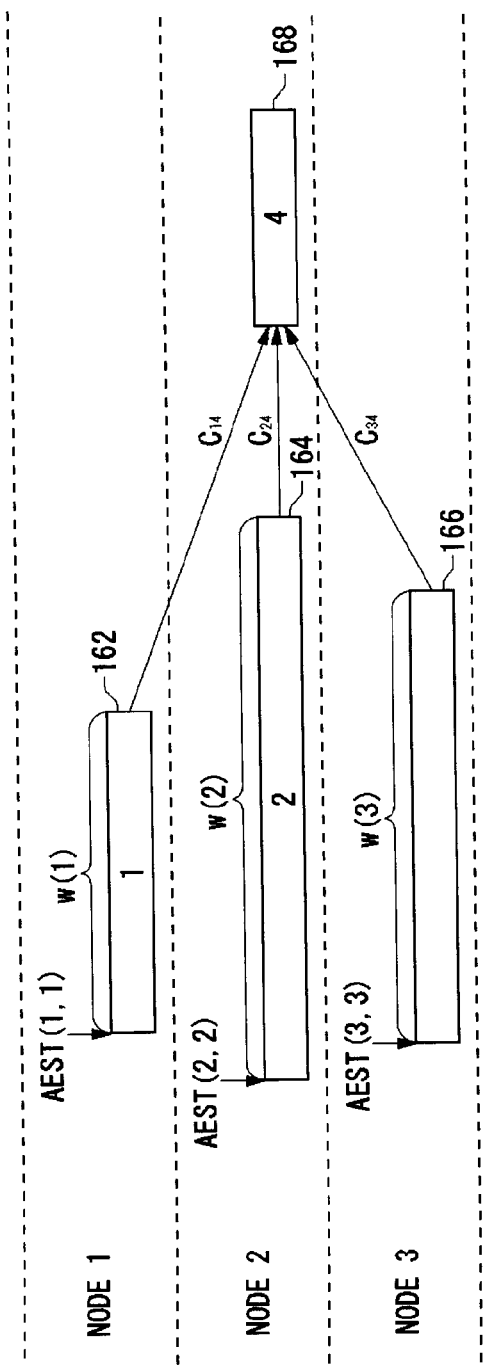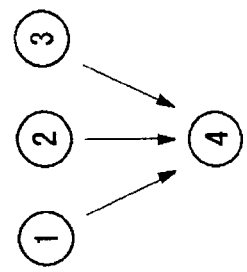
FIG.7A
FIG.7B

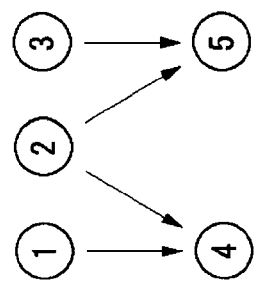
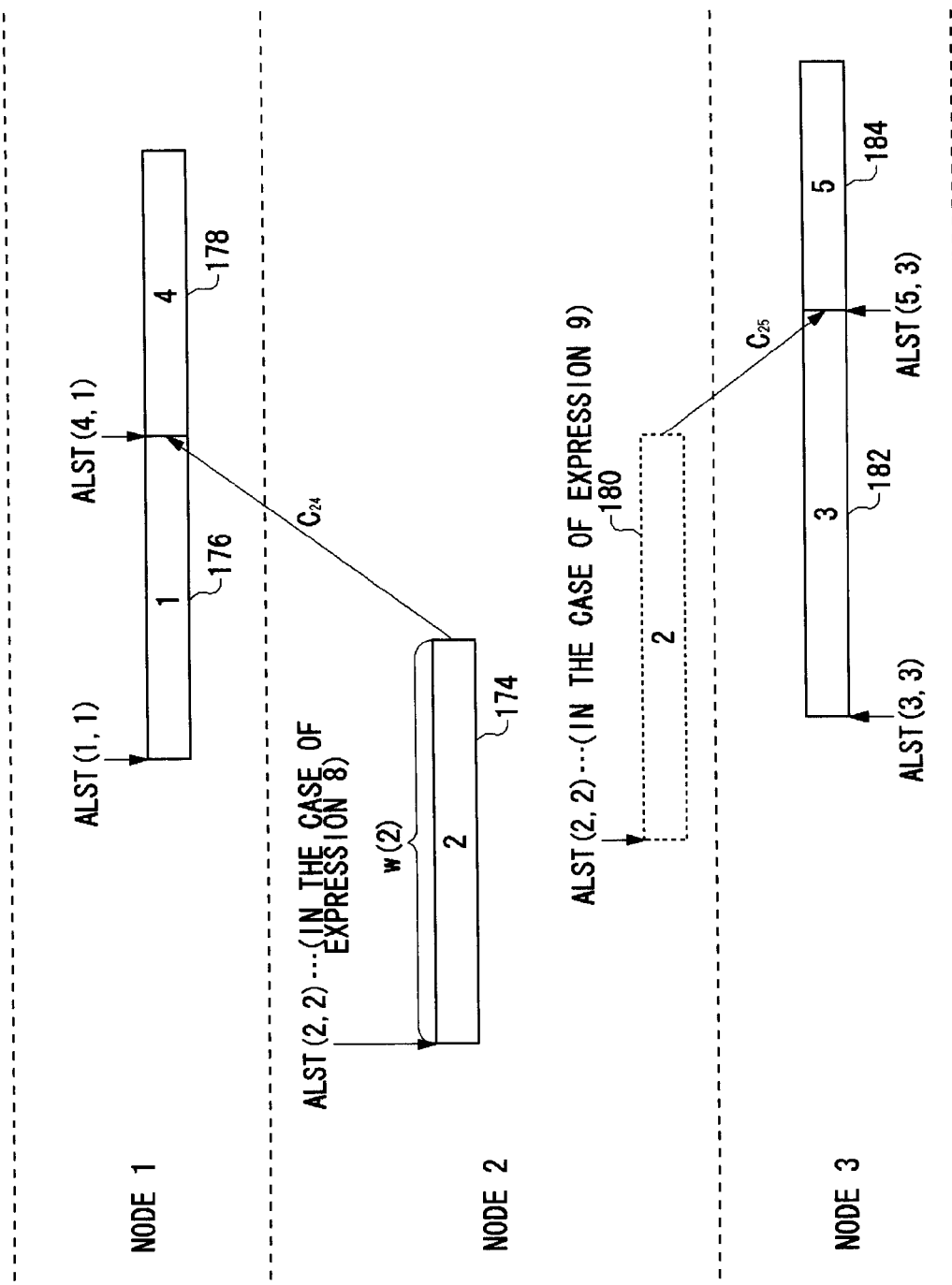
FIG.9A
FIG.9B

FIG.23

| TASK | AEST | ALST | TASK MOVABLE RANGE |
|---|---|---|---|
| 1-1 | 0 | -130 | -130 |
| 1-2 | 25 | -105 | -130 |
| 1-3 | 80 | -50 | -130 |
| 3-1 | 125 | -5 | -130 |
| 1-4 | 160 | 30 | -130 |
| 1-5 | 245 | 115 | -130 |
| 1-6 | 320 | 190 | -130 |
| 2-1 | 0 | -130 | -130 |
| 2-2 | 25 | -105 | -130 |
| 2-3 | 80 | -50 | -130 |
| 3-1 | 125 | 45 → -5 | -80 → -130 |
| 2-4 | 160 | 80 | -80 |
| 2-5 | 245 | 165 | -80 |
| 2-6 | 320 | 240 | -80 |

FIG.25

| TASK | AEST | ALST | TASK MOVABLE RANGE |
|---|---|---|---|
| 1-1 | 0 | -80 | -80 |
| 1-2 | 25 | -55 | -80 |
| 1-3 | 80 | 0 | -80 |
| 3-1 | 125 | 50 → 45 | -75 → -80 |
| 1-4 | 160 | 85 | -75 |
| 1-5 | 190 | 115 | -75 |
| 1-6 | 265 | 190 | -75 |
| 2-1 | 0 | -80 | -80 |
| 2-2 | 25 | -55 | -80 |
| 2-3 | 80 | 0 | -80 |
| 3-1 | 125 | 45 | -80 |
| 2-4 | 160 | 80 | -80 |
| 2-5 | 245 | 165 | -80 |
| 2-6 | 320 | 240 | -80 |

TASK ALLOCATION METHOD AND TASK ALLOCATION APPARATUS

BACKGROUND OF THE INVENTION

1. Field of the Invention

The present invention relates to a technology for allocating tasks to nodes in a distributed processing system comprising plural nodes each having at least one processor.

2. Description of the Related Art

In order to execute an application in a distributed processing system comprising plural nodes each having at least one processor, a determination should be made as to which node should be used to execute an application task. One problem encountered in this process is how to maintain consistency in computation, which is so important that an outcome of an event may affect all nodes. Conventionally, there has been known a method whereby consistency between nodes is maintained by communicating events between nodes or a method whereby consistency between nodes is maintained by allowing a representative node to serve as a dedicated server so that an important task is executed only in the representative node.

According to the first method, results of arithmetic operations in the nodes may differ so that consistency is lost. In the second method, non-representative nodes are connected to the representative node serving as a dedicated server. Therefore, it is difficult to switch to a different node to cause it to represent the nodes, or to add a new node while the application is being executed.

SUMMARY OF THE INVENTION

In this background, a general purpose of the present invention is to provide a technology to determine a destination node to which an application task should be allocated in a distributed processing system comprising plural nodes each having at least one processor.

One embodiment of the present invention relates to a task allocation method for allocating a plurality of tasks, which include those that are dependent (in an antecedent sense) on each other, to respective nodes in a distributed processing system including a plurality of nodes each provided with at least one processor and communicably connected to each other. The method comprises: for a single or a plurality of processors, computing an earliest start time at which a task can be started and an latest start time which is allowed in order to complete the task within a time constraint; computing a task movable range, which is defined as a difference between the earliest start time and the latest start time; and determining a destination node to which a task is allocated, giving priority to a task with a smaller task movable range.

The term "task" refers to an application programmed to achieve a certain purpose or the content of information processing included in the application. A task may represent an application or a unit smaller than an application such as input and output control or a user-designated command. An essential requirement is that a task represents a unit of process or function.

According to this embodiment, a destination node to which a task is allocated is determined in accordance with a task movable range. Therefore, an application task can be allocated to the most appropriate node from the perspective of processing time without specifying a representative node.

Replacement of constituting elements and various implementations of the invention in the form of methods, systems, computer programs, recording mediums storing computer programs, etc. may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 7A schematically shows the method of computing the AEST; and FIG. 7B shows an example of dependency between tasks;

FIG. 9A schematically shows the method of computing the ALST; and FIG. 9B shows an example of dependency between tasks;

FIG. 23 is a table listing the AEST, ALST and task movable range of the tasks of FIG. 22;

FIG. 25 is a table listing the AEST, ALST and task movable range of the tasks of FIG. 24;

DETAILED DESCRIPTION OF THE INVENTION

The invention will now be described by reference to the preferred embodiments. This does not intend to limit the scope of the present invention, but to exemplify the invention.

The present invention relates to a technology for allocating tasks to respective nodes so that time constraints imposed on the tasks are satisfied in executing an application in a distributed processing system comprising plural nodes.

A brief description will first be given of a system structure according to a first embodiment and tasks executed on the system. A detailed description will then be given of the operation of functional blocks with reference to flowcharts.

Figure 1:
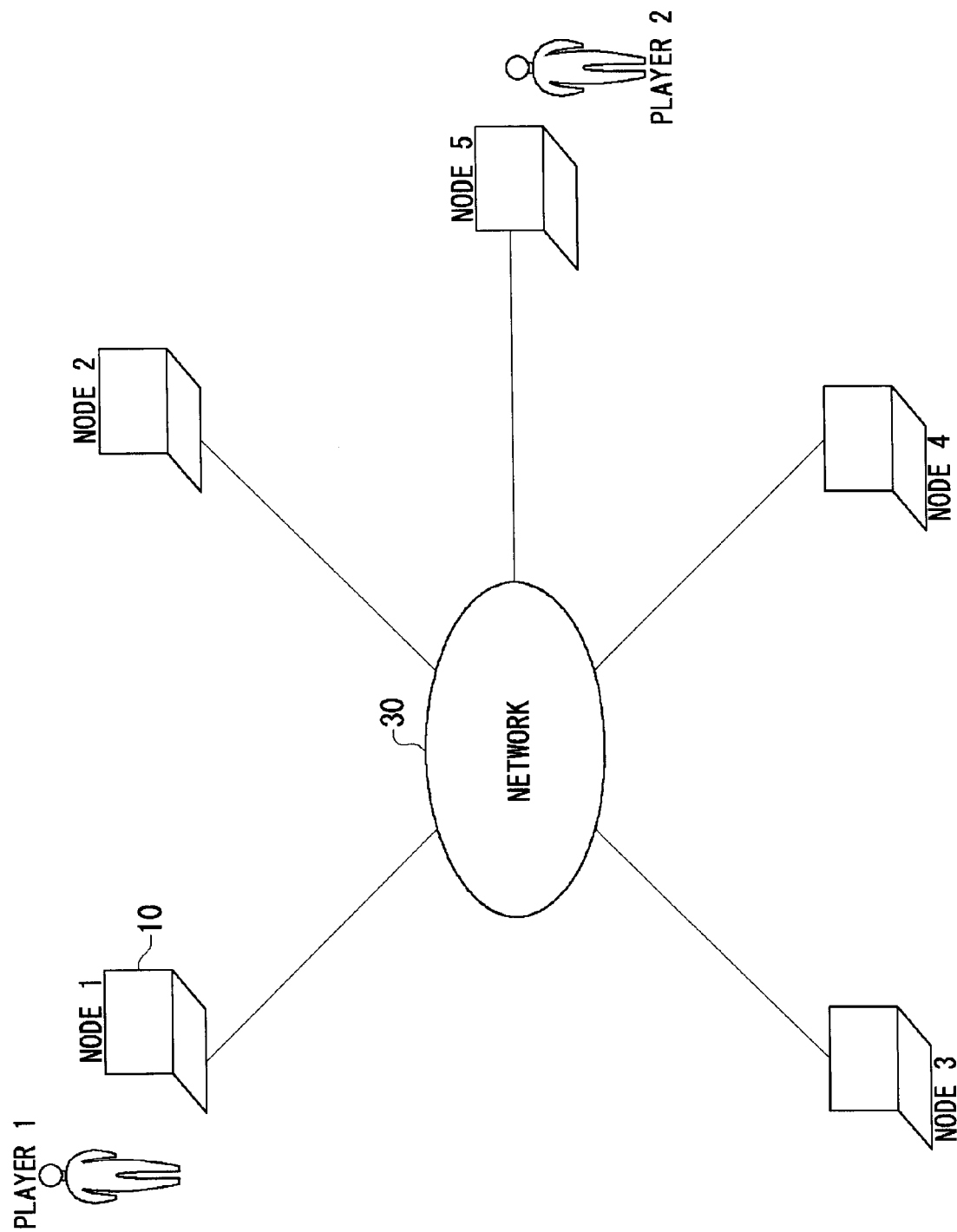
FIG. 1 shows the structure of a distributed application execution system according to an embodiment of the present invention.

FIG. 1 shows the structure of a distributed application execution system according to an embodiment of the present invention. Each node 10 comprises a general-purpose computer which is provided with one or more CPUs. It will be assumed here that the CPUs can use the same instruction set. The nodes 10 are capable of transmitting and receiving data over a network 30 such as the Internet. While FIG. 1 shows five computers of the nodes 1-5 are connected to the network 30, no constraints are imposed on the number of nodes constituting the distributed processing system.

A distributed application is executed in the environment of FIG. 1. The term "distributed application" refers to an application which uses plural appliances equipped with CPUs connected to the network simultaneously so as to share the load of processing.

Figure 2:
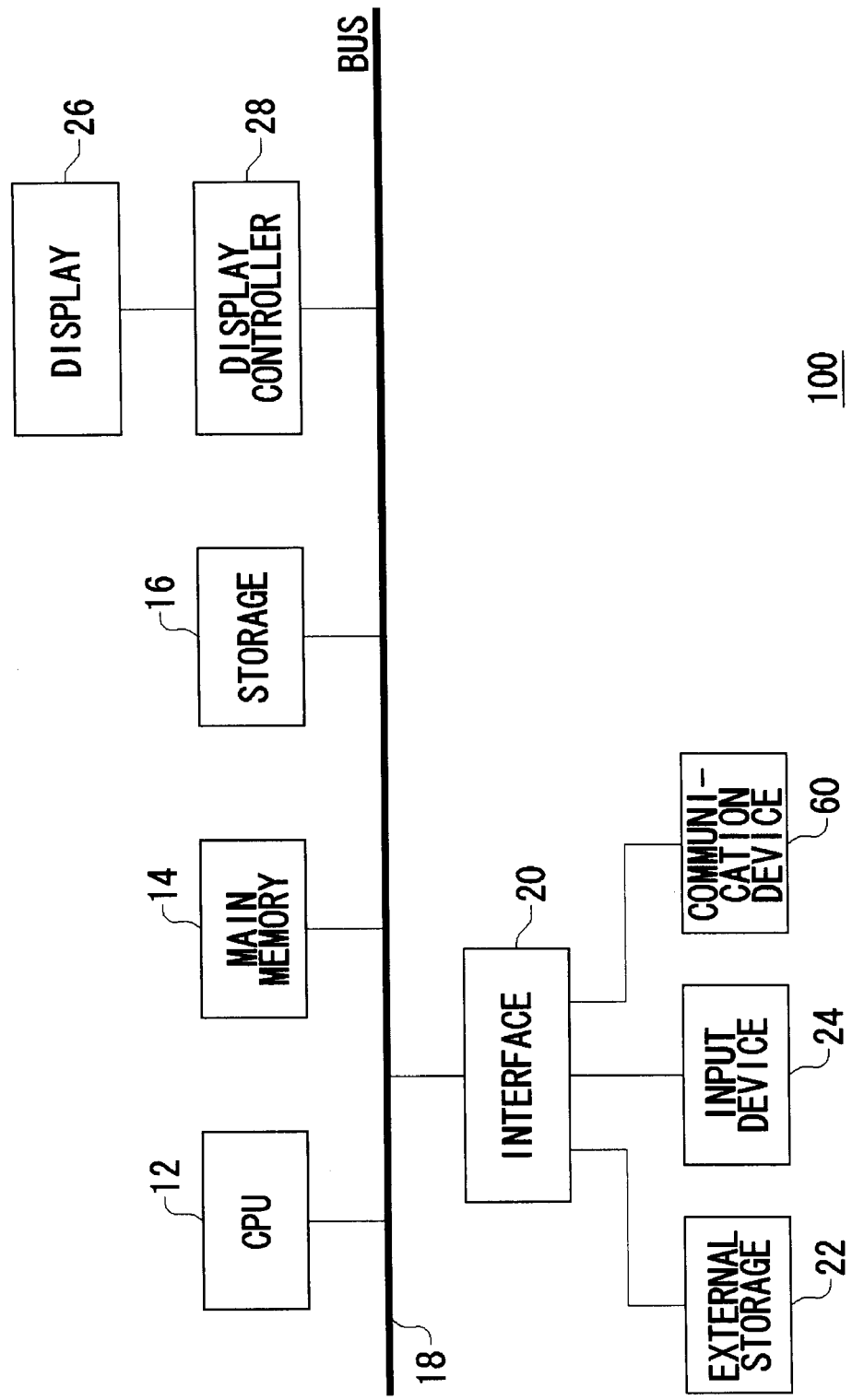
FIG. 2 schematically shows the structure of a general-purpose computer constituting each node.

FIG. 2 schematically shows the structure of a general-purpose computer 100 constituting each node. The computer 100 is provided with a CPU 12, a main memory 14, a storage device 16, an input and output interface 20 and a display controller 28. The CPU 12 performs overall control of the computer 100 and also executes a program for allocating tasks to nodes. The main memory 14 stores various data, a rendering program and the like. The components are connected to each other via a bus 18 to enable mutual data transmission and reception. A display 26 for outputting an image generated as a result of executing the application is connected to the display controller 28. Connected to the input and output interface 20 are: an external storage device 22 such as a CD-ROM drive, DVD-ROM drive or hard disk drive; and an input device 24 such as a keyboard or mouse for supplying data to the computer 100. The input and output interface 20 controls the input and output of data to and from the external storage device 22 and the input device 24. The input and output interface 20 reads data and a program stored in the external storage device 22 and supplies the same to the main memory 14. A communication device 60 for communicating with a computer constituting another node so as to retrieve data and a program therefrom is also connected to the input and output interface 20.

While the distributed application assumed in the following description of the embodiment is an online beat'-em-up game, the embodiment may also be applied to an arbitrary distributed application which demands that tasks be processed in plural nodes.

Figure 3:
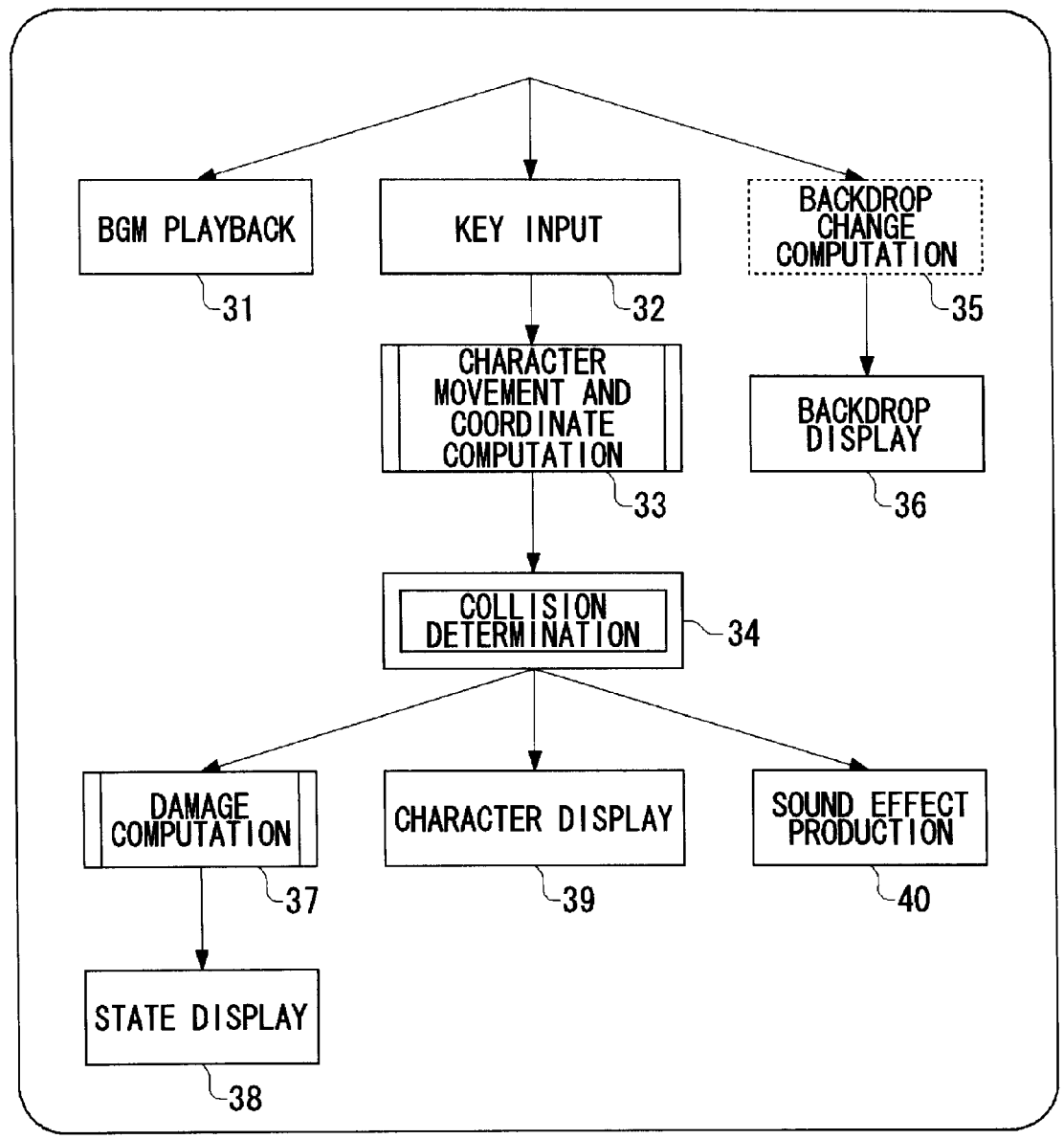
FIG. 3 schematically shows tasks to be executed in the nodes and constraints imposed on the order of execution of tasks.

FIG. 3 schematically shows an overview of tasks to be executed in the nodes performing processes for respective players and constraints imposed on the order of execution of tasks. Each block in the figure represents a task. An arrow represents a constraint on the order of execution of tasks. A rectangular block shown in solid line represents a task which should be executed only in the associated player node. For example, tasks like "BGM playback 31", "key input 32", "backdrop display 36", "character display 39" and "sound effect production 40" would not have meaning in the context of the game application unless they are executed in the associated player nodes. A rectangular block bounded by double vertical lines at the ends represents a task that can be executed at an arbitrary node connected to the network. "Character movement and coordinate computation 33" and "damage computation 37" are "node-free" tasks so long as the display that uses the result of computation is output at the associated player nodes.

A double-line block represents a computation task which should be executed in a single node for all players. The task may be executed in arbitrary node. "Collision determination 34" is a task for computing the result of contact between characters within a game environment. Computation like this may produce inconsistency if executed on plural nodes. As such, it should be executed intensively in a single node after the coordinates have been computed for all players. A rectangular block in broken line represents a computation task which may be executed in a single node or in plural distributed nodes. "Backdrop change computation 35" for computing the backdrop that varies independent of the movement of a character in a game environment may be executed in a single node so long as the result of computation is supplied to the nodes.

Figure 4:
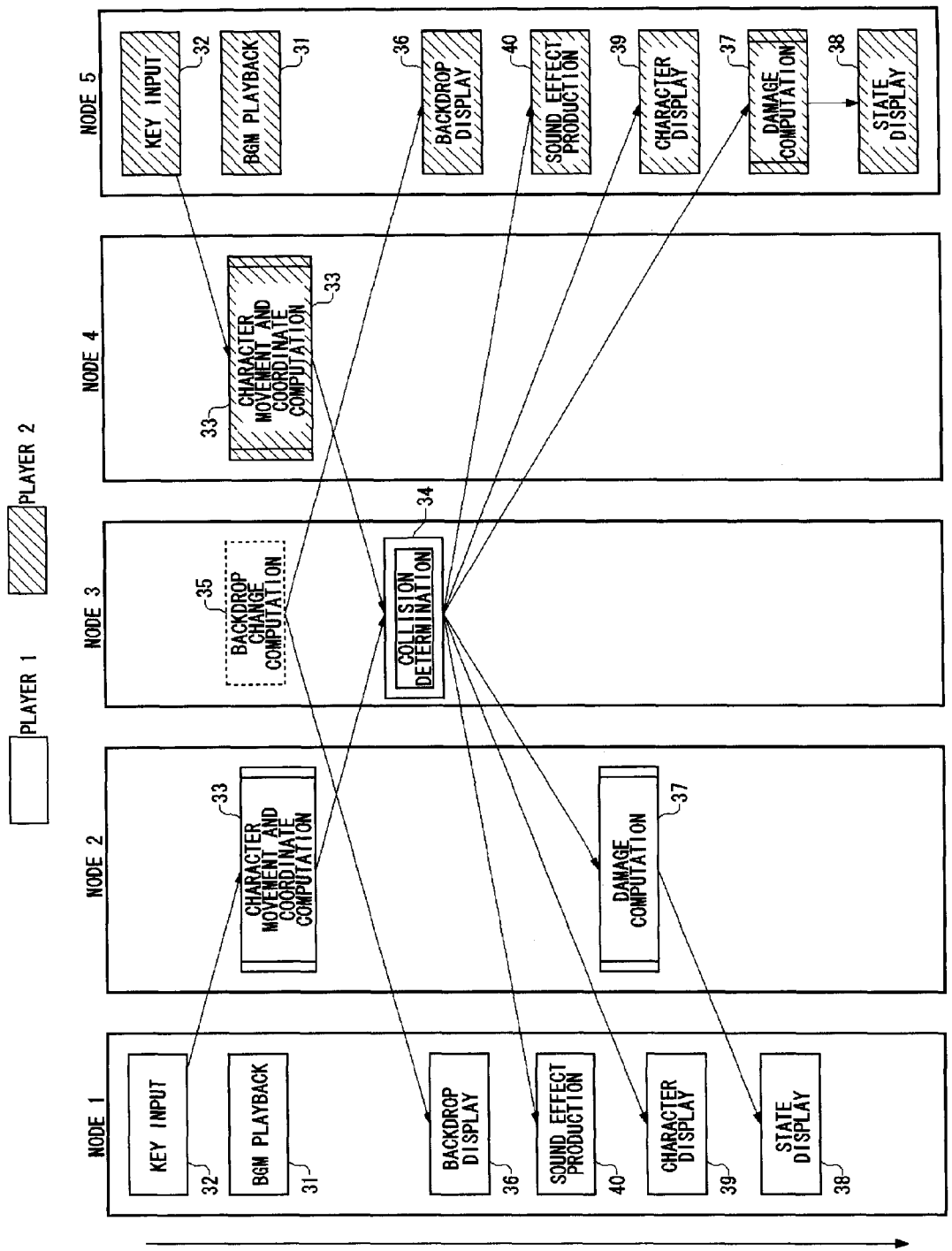
FIG. 4 shows an example of a result of task allocation.

FIG. 4 shows an example of the result of task allocation according to the embodiment. Nodes 1-5 of FIG. 4 correspond the nodes 1-5 of FIG. 1. The node 1 is a node performing processes for the player 1. The node 5 is a node performing processes for the player 2. The nodes 2-4 are nodes not associated with any players. Referring to FIG. 4, those of rectangular blocks and blocks bounded by double vertical lines that are not shaded represent tasks related to the player 1. Those that are shaded represent tasks related to the player 2.

As shown in FIG. 4, tasks like "key input 32", "BGM playback 31" and "backdrop display 36" are allocated to the node 1 and the node 5 associated with the respective players. Referring to FIG. 4, "character movement and coordinate computation 33" related to the player 1 is allocated to the node 2 instead of the node 1. "Character movement and coordinate computation 33" related to the player 2 is allocated to the node 4 instead of the node 5. "Collision determination 34" to be executed in a single node is executed in the node 3 upon receiving data from "character movement and coordinate computation 33" executed in the node 2 and the node 4. The result of computation in "collision determination 34" is transmitted to tasks allocated to the nodes 1, 2 and 5. As a result, audio playback and screen display are achieved at the node 1 and the node 5, while consistency between computation results is maintained across the nodes. The task allocation described above is only by way of example and other ways of allocation are also possible.

As described, allocation of tasks is predicated on a variety of conditions; some should be executed in a particular node, while some may be executed in an arbitrary node. Also, processing time differs from task to task, and time required to transfer a computation result from one task to another also differs. Further, since a game application involves rendering of a screen, a sequence of processes for a single player from key input to screen display must be completed within a time slot for one frame (for example, 1/60 second).

Accordingly, destination nodes to which tasks within an application are allocated in a distributed application execution environment largely affect consistency between computation results across the nodes and the processing time that can be consumed to ensure real-time availability.

A description will be given below of a method of allocating application tasks automatically and properly in a distributed application execution system as shown in FIG. 1.

Figure 5:
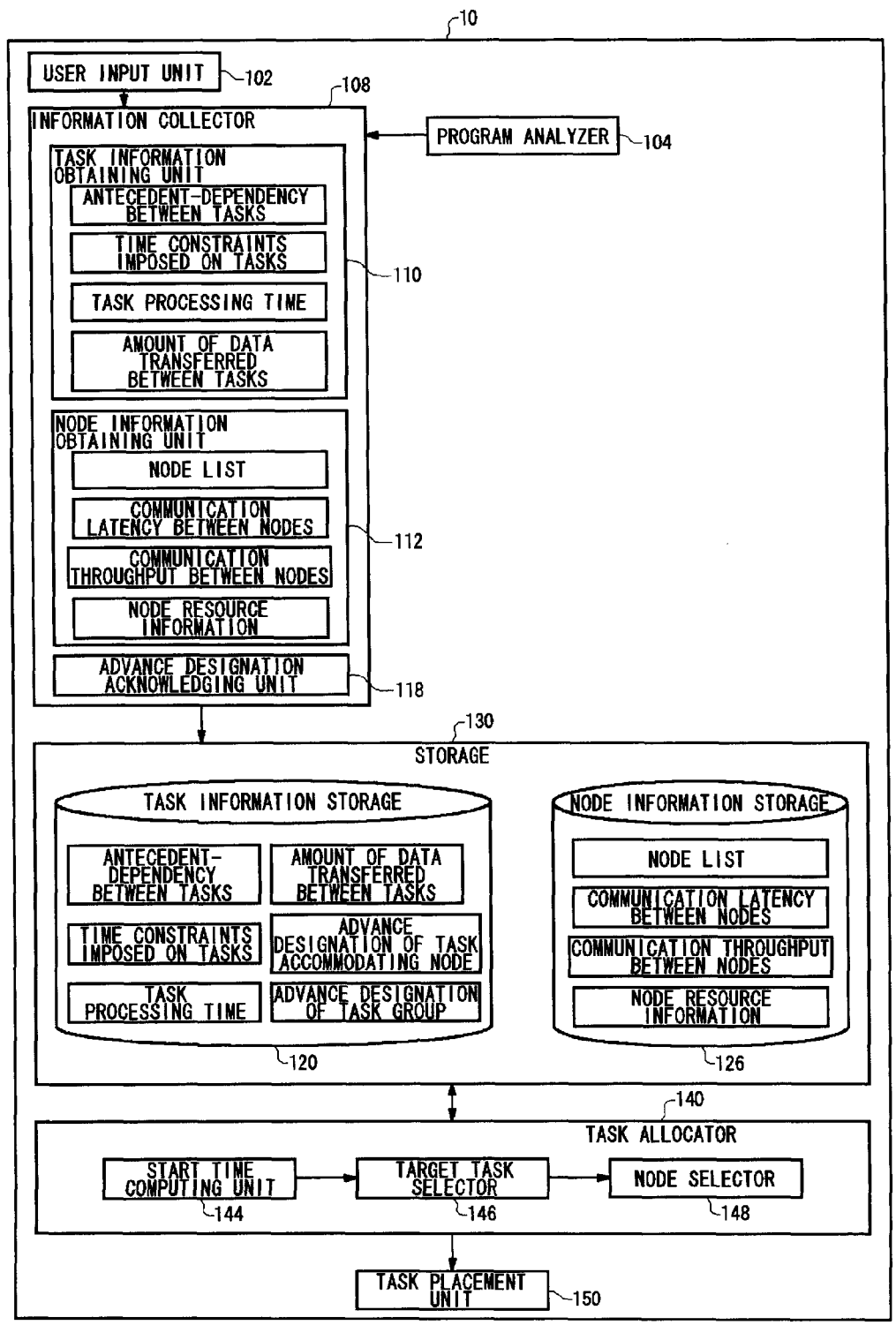
FIG. 5 is a functional block diagram of a node executing task allocation according to the embodiment.

FIG. 5 is a functional block diagram of the node 10 executing task allocation according to the embodiment. Each block performs a process necessary to achieve task allocation in a distributed application execution environment. The node 10 may be implemented by hardware such as a CPU, RAM, ROM, etc. The node 10 may also be implemented by software such as a program which accomplishes functions for data input, data latch, computation, communication and the like. FIG. 5 depicts functional blocks implemented by the cooperation of hardware and software. Therefore, the functional blocks may be implemented in a variety of manners by a combination of hardware and software.

A user input unit 102 receives data input from a user via a keyboard, mouse or the like.

An information collector 108 collects various information necessary to accomplish task allocation. The information collector 108 includes: a task information obtaining unit 110 which obtains information related to tasks; a node information obtaining unit 112 which obtains information related to nodes; and an advance designation acknowledging unit 118 which acknowledges advance designation described later.

The task information obtained by the task information obtaining unit 110 includes antecedent-dependency between tasks, time constraints imposed on the tasks that should be satisfied to ensure realtime availability, task processing time required to execute a task in the worst case and the amount of data transferred between tasks. For example, if an application should be executed periodically at predetermined intervals, the interval represents a time constraint. Time limit allowed since the start of execution of an application until the completion thereof also represents a time constraint. Hereinafter, a time constraint is expressed as a "deadline time".

The node information obtained by the node information obtaining unit 112 includes a node list, communication latency between nodes, communication throughput between nodes and node resource information. The node resource information relates to computing resources such as the state of computational load in a node to which a task should be allocated, and CPU capabilities and memory capacity of the node. The information may be obtained by allowing a load monitoring unit (not shown) to be notified of the current amount of load from the nodes connected to the network. Alternatively, the information may be obtained by providing a mechanism for transmitting the information to the operating system.

Communication time between tasks can be computed from the amount of data transferred between tasks, communication latency between nodes and throughput between nodes.

The information received by the advance designation acknowledging unit 118 includes advance designation of nodes to which tasks are allocated and advance designation of task group.

For time constraints of the tasks, task processing time, amount of data transferred between tasks, node list, communication latency between nodes and communication throughput between nodes, information input in advance by the programmer of the application executed may be used. Alternatively, the result of estimation by analyzing the application program by a program analyzer 104 using a program analysis tool may be used. For latency between nodes and communication throughput between nodes, values estimated from the network configuration may be used.

A storage device 130 stores various data necessary for task allocation obtained by the information collector 108. A task information storage 120 stores the antecedent-dependency between tasks, time constraints of the tasks, task processing time and amount of data transferred between tasks, information on advance designation of node accommodating a task and information on advance designation of task group. A node information storage 126 stores a node list, communication latency between nodes, communication throughput between nodes and node resource information.

A task allocator 140 performs task allocation for allocating application tasks to nodes within the network, by referring to at least one of various kinds of information located in the storage device 130. The task allocator 140 includes a start time computing unit 144, a target task selector 146 and a node selector 148.

The start time computing unit 144 computes an absolute earliest start time (AEST) and an absolute latest start time (ALST) for each task or task group. It is noted that the term "absolute" is contemplated herein to mean either an arbitrary point in time or a point in time that is dependent on some other factor, such as a software or hardware property of the system. Computation of AEST will be described with reference to FIGS. 7 and 8 and computation of ALST will be described with reference to FIGS. 9 and 10.

The target task selector 146 selects a task which is a target of task allocation. In this selection, the AEST and ALST are used. The target task selection will be explained with reference to the flowchart of FIG. 11.

The node selector 148 performs node selection for determining a node within the network to which the task which is a target of task allocation (hereinafter, referred to as "allocation target task") is allocated. The node selection will be described with reference to the flowcharts of FIGS. 13-17.

A task placement unit 150 places tasks to nodes in accordance with the result of process in the task allocator 140. The task placement unit 150 transmits to the nodes information necessary to actually execute the tasks. That is, the task placement unit 150 transmits information such as the task's program code and initial data and nodes to which tasks bounded by antecedent-dependant relationship are allocated. A storage device in each node may store plural codes so that, instead of transmitting a program code, the task placement unit 150 may transmit the ID number of a necessary code.

The tasks thus placed are subject to distributed processing in the nodes. In this process, coordination might not be maintained if the nodes are permitted to execute respective tasks on their own. In this respect, the task placement unit 150 may issue instructions for the start, suspension and abort of execution to the nodes for the purpose of ensuring that the nodes wait until all tasks of the distributed application are ready for execution so that the nodes can start executing the tasks all at once.

The task placement unit 150 may direct the task allocator 140 to reallocate the tasks in case there is a change in the situation of the nodes within the network (for example, when a new node is added or when the execution of a task is rendered difficult due to disconnection of a node from the network).

A summarized description will now be given of task allocation according to the embodiment. The absolute earliest start time (AEST) and the absolute latest start time (ALST) allowed to observe a deadline are determined for each task. The task characterized by the smallest difference between the AEST and ALST, namely, the most time-stringent task, is selected. A determination is then made on the node to which the selected task is allocated. The AEST and ALST are computed in consideration of the task processing time and communication time between tasks. When the destination node to which a task is allocated is determined, the AEST and the ALST are recomputed accordingly for all tasks. The next allocation target task is determined in accordance with the result of computation. Thus, priority is given to important tasks in determining a node to which a task is allocated.

Figure 6:
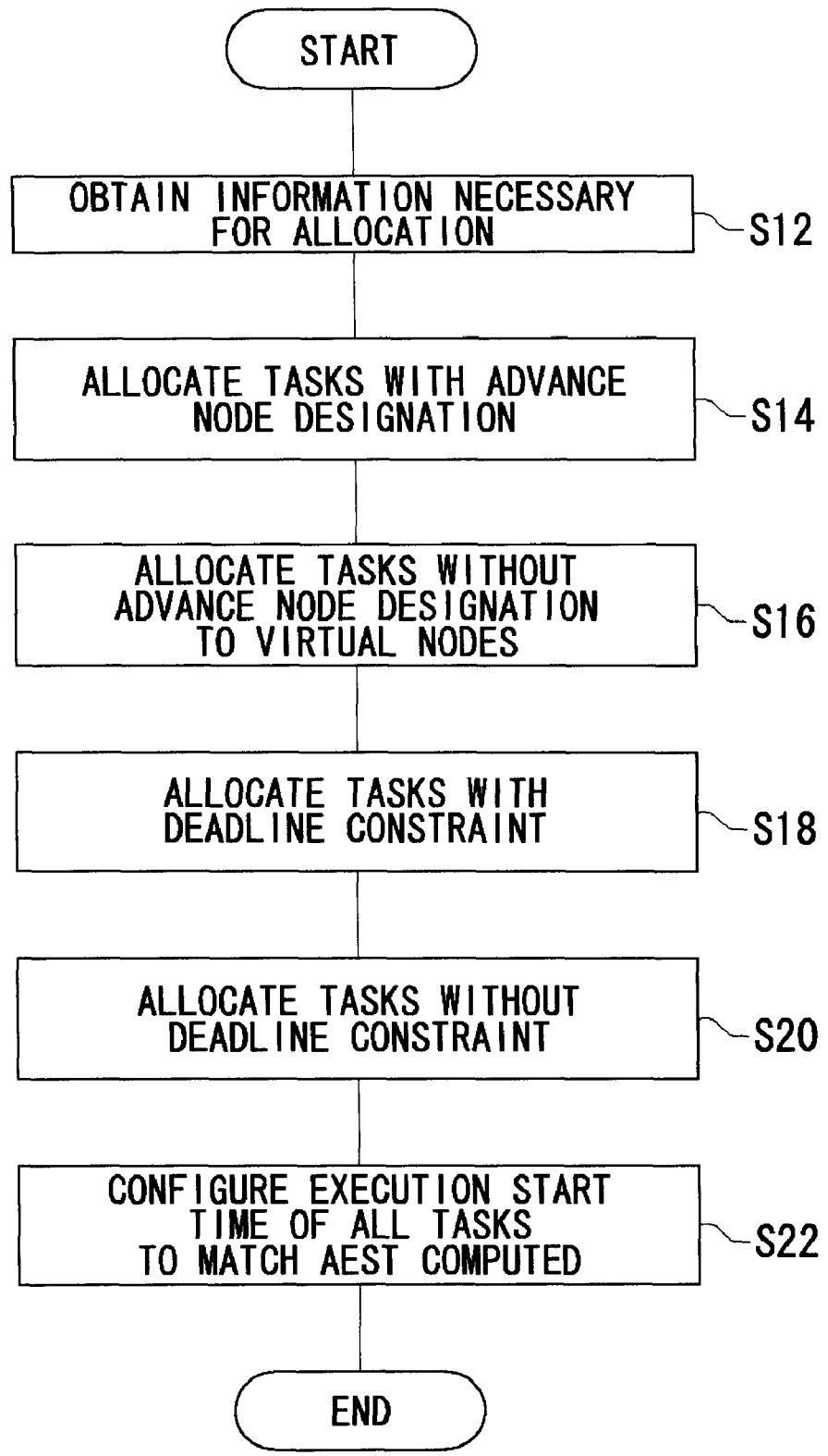
FIG. 6 is a main flowchart for task allocation.

FIG. 6 is a main flowchart for the task allocation performed in the node 10. First, the programmer of the application stores predetermined information related to the nodes and tasks in one of the nodes within the network. Preferably, the destination of storage is a storage device connected to a node executing the task allocation. Alternatively, the destination of storage may be a storage device of another node connected via the network. The information to be stored includes the time constraint and task processing time, as described above. If there is a task that should be executed in a specific node, the advance node destination information and/or advance group designation information may also be stored. Instead of storing the above information in advance as stationary values, each node may determine the information by analyzing the application program.

Subsequently, the information collector 108 of one of the nodes within the network obtains the task information, node information and advance designation information (S12). A determination is then made on the nodes to which the tasks are allocated. Task allocation is executed in five steps. First, tasks with advance node designation are allocated (S14). Such tasks are simply allocated to the designated nodes. If a group is also designated in advance for the task with advance node designation, the entire tasks in the group are allocated to the designated node. Tasks without advance node designation are then allocated to mutually different virtual nodes (S16). In this process, tasks with advance group designation are allocated to the same virtual node on a group by group basis. Subsequently, of those tasks allocated to the virtual nodes, tasks with deadline constraints are subject to the task allocation process described later with reference to FIG. 11 (S18). Further, of those tasks allocated to the virtual nodes, tasks without deadline constraints are subject to the task allocation process described later (S20). Finally, the execution time of all tasks allocated to the nodes is configured to match the AEST computed in S14-S20, whereupon the task placement unit 150 places the tasks to the respective nodes so that the tasks are executed at the time defined by the AEST (S22).

It is preferable that the node responsible for the task allocation of FIG. 6 be a node issuing a request for the execution of the distributed application. Therefore, any member requesting the execution of the application may be responsible for the allocation. Since the allocation is performed in parallel, it is ensured that the allocation is re-executed as necessary if the load state of the nodes is updated at this timing.

Different methods may be employed to determine a node within the distributed application execution system to be a node responsible for task allocation. In this case, some of the nodes within the system may be pre-selected as nodes that can be responsible for allocation.

A description will now be given of the AEST and ALST. The absolute earliest start time AEST indicates the earliest time that a task can be started. The absolute earliest start time is determined as follows. For all ancestor tasks of a target task for which the AEST is computed, the absolute earliest start time of the ancestor task, the processing time of the ancestor task and the communication time from the ancestor task to the target task are added together. The maximum of the added values (that is, the latest time) represents the AEST of the target task.

The absolute latest start time ALST indicates the latest start time allowed in order to complete a given task within the time constraint. The absolute latest start time is determined as follows.

(1) If the target task for which the ALST should be computed is with a dead line constraint,
(1-1) For all tasks that descend from the target task, the processing time of the target task and the communication time from the target task to the descendant task are subtracted from the absolute latest start time of the descendant task.
(1-2) The processing time of the target task is subtracted from the deadline time of the target task.
The smaller of these two values (that is, the earliest time) gives the ALST to be computed.
(2) If the target task is without a deadline constraint, For all tasks that are descendants of the target task, the processing time of the target task and the communication time from the target task to the descendant task are subtracted from the absolute latest start time of the descendant task. The smallest value resulting from this calculation (that is, the earliest time) gives the ALST to be computed.

The method for computing the AEST and ALST is described Yu-Kwong Kwok, Ishfaq Ahmad, Dynamic Critical-Path Scheduling: An Effective Technique for Allocating Task Graphs to Multiprocessors, IEEE Transactions on Parallel and Distributed Systems, 1996 March, vol. 7, pp. 506-521. Only a summarized description will be given in this specification.

FIG. 7A schematically shows the method of computing the AEST, and FIG. 7B shows an example of dependency between tasks. Referring to FIG. 7B, numerals inside blank circles denote task IDs. Arrows denote dependency. FIG. 7B shows that "task 1", "task 2" and "task 3" are ancestors of "task 4".

The term "dependency between tasks" refers to a relationship wherein the result of processing a given task is used in processing another task. Of those tasks that are dependant on each other, the task which precedes a target task in time will be referred to as a "ancestor task (or a parent task)". The task which succeeds the target task in time will be referred to as a "descendant task".

The AEST of a task $n_i$ in an arbitrary node J is given by the following expression.

$$AEST(n_i,J) = \max_{1 \leq k \leq p}\{AEST(n_{ik},PE(n_{ik})) + w(n_{ik}) + r(PE(n_{ik}),J)c_{ki}\} \quad (1)$$

where $n_i$ denotes a task for which the AEST should be computed, $n_{ik}$ denotes the kth ancestor task of the task $n_i$, and $1 \leq k \leq p$, namely, it is assumed that there are p ancestor tasks of the task $n_i$.

$PE(n_{ik})$ denotes the ID of a node to which the kth ancestor task of the task $n_i$ is allocated. $w(n_{ik})$ denotes the processing time of the ancestor task $n_{ik}$. $r(PE(n_{ik}), J)$ is a coefficient which is equal to 0 if the node $PE(n_{ik})$ to which the ancestor task is allocated is the same as the node J to which the target task is allocated, and 1 otherwise. $c_{ki}$ denotes the communication time from the ancestor task to the target task. Referring to the expression (1), the left hand side represents "the AEST of the target task $n_i$ in the node J". The first term on the right hand side represents "the AEST of the ancestor task $n_{ik}$", the second term represents "the processing time of the ancestor task $n_{ik}$" and the third term represents "the communication time from the ancestor task $n_{ik}$ to the target task $n_i$".

AEST=0 for the task at the top of a list (entry task) since there are no ancestor tasks.

A specific description will now be given of the procedure for computing the AEST of the task 4 with reference to the dependency between tasks shown in FIG. 7B. Referring to FIG. 7B, three tasks (task 1-task 3) are ancestors of the task 4. Therefore, k=1-3. Given that i=4 in the expression (1), $n_4$ represents the task 4, $n_{41}$ represents the task 1, $n_{42}$ represents the task 2 and $n_{43}$ represents the task 3.

Assuming that the task 1, task 2 and task 3 are allocated to the node 1, node 2 and node 3, respectively, $PE(n_{41})=PE(1)=1$, $PE(n_{42})=PE(2)=2$ and $PE(n_{43})=PE(3)=3$. Computing the AEST(4,2) that results when the task 4 is allocated to the node 2 according to the expression (1), we obtain the following (see a block 168 of FIG. 7A).

$$AEST(4,2)=\max_{1\leq k\leq 3}\{AEST(n_{4k},PE(n_{4k}))+w(n_{4k})+r(PE(n_{4k}),2)c_{k4}\} \quad (2)$$

Substituting k=1 into the expression (2), the following expression holds as $n_{41}$ corresponds to the task 1 (a block 162).

$$AEST(1,PE(1))+w(1)+r(PE(1),2)c_{14}=AEST(1,1)+w(1)+r(1,2)c_{14} \quad (3)$$

Substituting k=2 into the expression (2), the following expression holds as $n_{42}$ corresponds to the task 2 (a block 164).

$$AEST(2,PE(2))+w(2)+r(PE(2),2)c_{24}=AEST(2,2)+w(2)+r(2,2)c_{24}=AEST(2,2)+w(2) \quad (4)$$

Substituting k=3 into the expression (2), the following expression holds as $n_{43}$ corresponds to the task 3 (a block 166).

$$AEST(3,PE(3))+w(3)+r(PE(3),2)c_{34}=AEST(3,3)+w(3)+r(3,2)c_{34} \quad (5)$$

The maximum of the values computed according to the expressions (3) through (5) is determined as the AEST(4,2).

Figure 8:
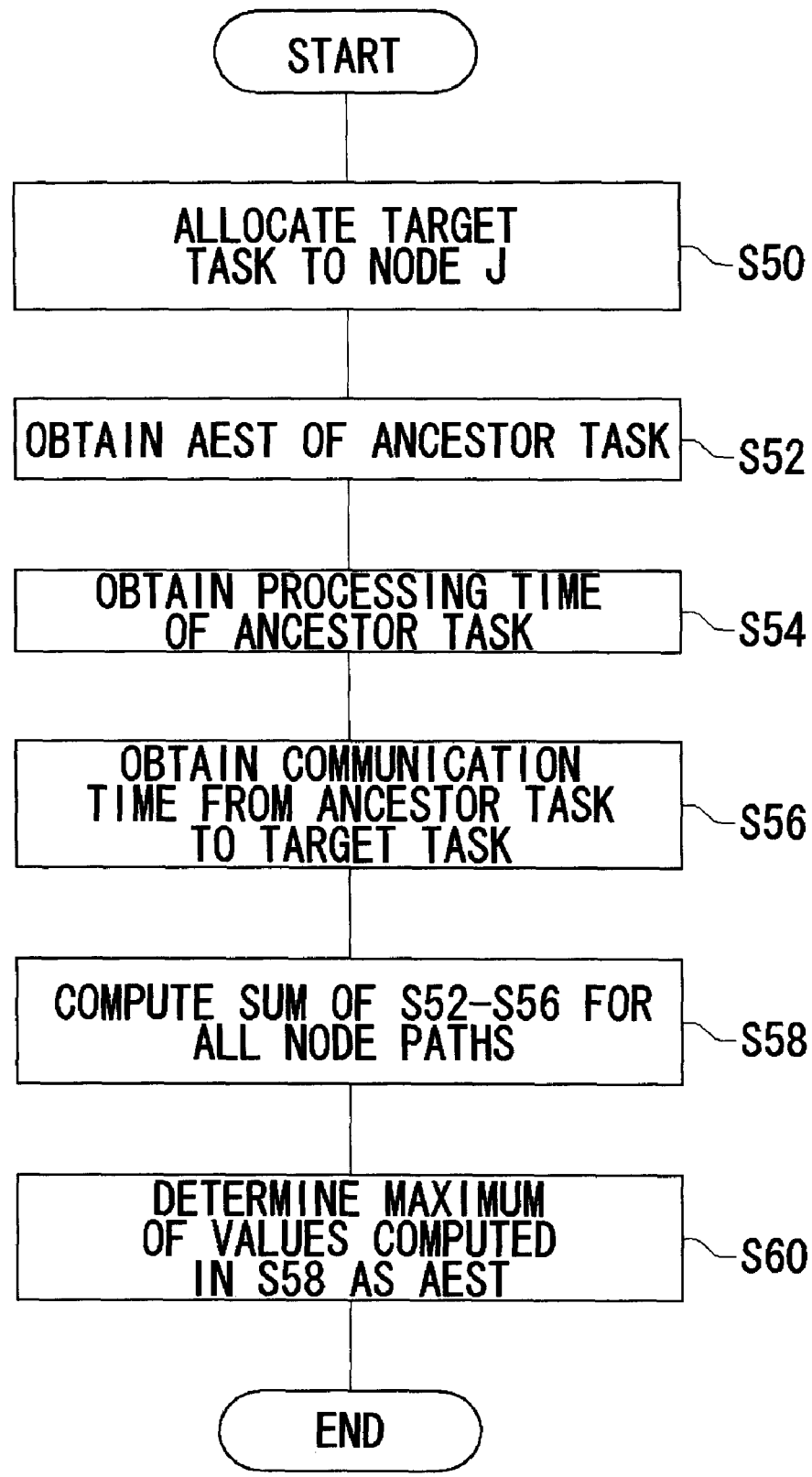
FIG. 8 is a flowchart for the process for computing the AEST.

FIG. 8 is a flowchart for the above process. First, a target task $n_i$ is tentatively allocated to a node J (S50). The start time computing unit 144 computes the AEST of an ancestor task of the target task $n_i$ (S52) and obtains the processing time of the ancestor task from the task information storage 120 (S54). The start time computing unit 144 obtains the amount of data transferred between tasks from the task information storage 120 and obtains the latency and throughput from the node information storage 126. The start time computing unit 144 also computes the communication time from the ancestor task to the target task $n_i$ that results when the target task $n_i$ is allocated to the node J (S56). If the ancestor task and the target task $n_i$ are located in the same node, the communication time is zero.

Subsequently, the values obtained in S52-S56 are added according to the expression (1) (S58). That is, the AEST of the ancestor task computed in S52, the processing time of the ancestor task obtained in S54 and the communication time between tasks obtained in S56 are added. The computation in S50-S58 is performed for all ancestor tasks $n_{ik}$ of the task $n_i$. The maximum of the values computed in S58 is determined as the AEST of the target task $n_i$ (S60).

FIG. 9A schematically shows the method of computing the ALST. FIG. 9B shows an example of dependency between tasks. As in FIG. 7B, numerals inside blank circles denote task IDs. Arrows denote dependency. That is, FIG. 9B shows that "task 4" descends from "task 1", "task 4" and "task 5" descend from "task 2" and "task 5" descends from "task 3".

ALST represents the latest permitted time at which the task should be started in order to complete all tasks. The ALST of a task $n_i$ in an arbitrary node J is given by the following expression.

$$ALST(n_i,J)=\min_{1\leq m\leq q}\{ALST(n_{im},PE(n_{im}))-r(PE(n_{im}),J)c_{im}-w(n_i),Deadline(n_i)-w(n_i)\} \quad (6)$$

where $n_i$ denotes a task for which the ALST should be computed, $n_{im}$ denotes the mth descendant task of the task $n_i$, and $1\leq m\leq q$, namely, it is assumed that there are q descendant tasks of the task $n_i$.

$PE(n_{im})$ denotes the ID number of a node to which the mth descendant task of the task $n_i$ is allocated. $w(n_i)$ denotes the processing time of the target task. $r(PE(n_{im}),J)$ is a coefficient which is equal to 0 if the node $PE(n_{im})$ to which the descendant task $n_{im}$ is allocated is the same as the node J to which the target task is allocated, and 1 otherwise. $c_{im}$ denotes the communication time from the target task to the descendant task. Referring to the expression (6), the left hand side represents "the ALST of the target task $n_i$ in the node J". The first term appearing on the right hand side represents "the ALST of the descendant task $n_{im}$", the second term represents "the communication time from the target task $n_i$ to the descendant task $n_{im}$" and the third term represents "the processing time of the target task $n_i$".

The ALST of the last task (exit task) is given as follows:
If a deadline time is designated: ALST=(deadline time Deadline($n_i$)–(processing time w($n_i$))
If there is no deadline time designated: ALST=∞
Therefore, if the ALST is computed for a path in which a deadline time is not designated and for a path in which a deadline time is designated, the ALST computed for the path in which a deadline time is designated is employed without exception.

A deadline constraint may be imposed not only on an exit task but also on a task in the middle of a path.

A specific description will now be given of the procedure for computing the ALST of the task 2 with reference to the dependency between tasks shown in FIG. 9B. Referring to FIG. 9B, two tasks (task 4 and task 5) are descendants of the task 2. Therefore m=1, 2. Given that i=2 in the expression (6), $n_2$ represents the task 2, $n_{21}$ represents the task 4 and $n_{22}$ represents the task 5.

Assuming that the task 4 and task 5 are allocated to the node 1 and the node 3, respectively, $PE(n_{21})=PE(4)=1$ and $PE(n_{22})=PE(5)=3$. Computing the ALST(2,2) that results when the task 2 is allocated to the node 2 according to the expression (6), we obtain the following.

$$ALST(2,2)=\min_{1\leq m\leq 2}\{ALST(n_{2m},PE(n_{2m}))-r(PE(n_{2m}),J)c_{2m}-w(n_2),Deadline(n_2)-w(n_2)\} \quad (7)$$

Assuming that m=1 in the expression (7), the following expression holds since $n_{21}$ corresponds to the task 4 (a block 178).

$$\{ALST(4,PE(4))-r(PE(4),2)c_{24}-w(2),Deadline(2)-w(2)\}=\{ALST(4,1))-r(1,2)c_{24}-w(2),Deadline(2)-w(2)\} \quad (8)$$

Assuming that m=2 in the expression (7), the following expression holds since $n_{22}$ corresponds to the task 5 (a block 184).

$$\{ALST(5,PE(5))-r(PE(5),2)c_{25}-w(2),Deadline(2)-w(2)\}=\{ALST(5,3))-r(3,2)c_{25}-w(2),Deadline(2)-w(2)\} \quad (9)$$

The smallest of the values computed according to the expressions (8) and (9) will be determined as the ALST(2, 2). In the example of FIG. 9A, the value of ALST(2,2) of the block 174 corresponding to the result from the expression (8) is smaller than the value of ALST(2,2) of the block 180 corresponding to the result from the expression (9). That is, the ALST of the block 180 is earlier than that of the block 174. Therefore, ALST(2,2) of the block 174 is employed.

Figure 10:
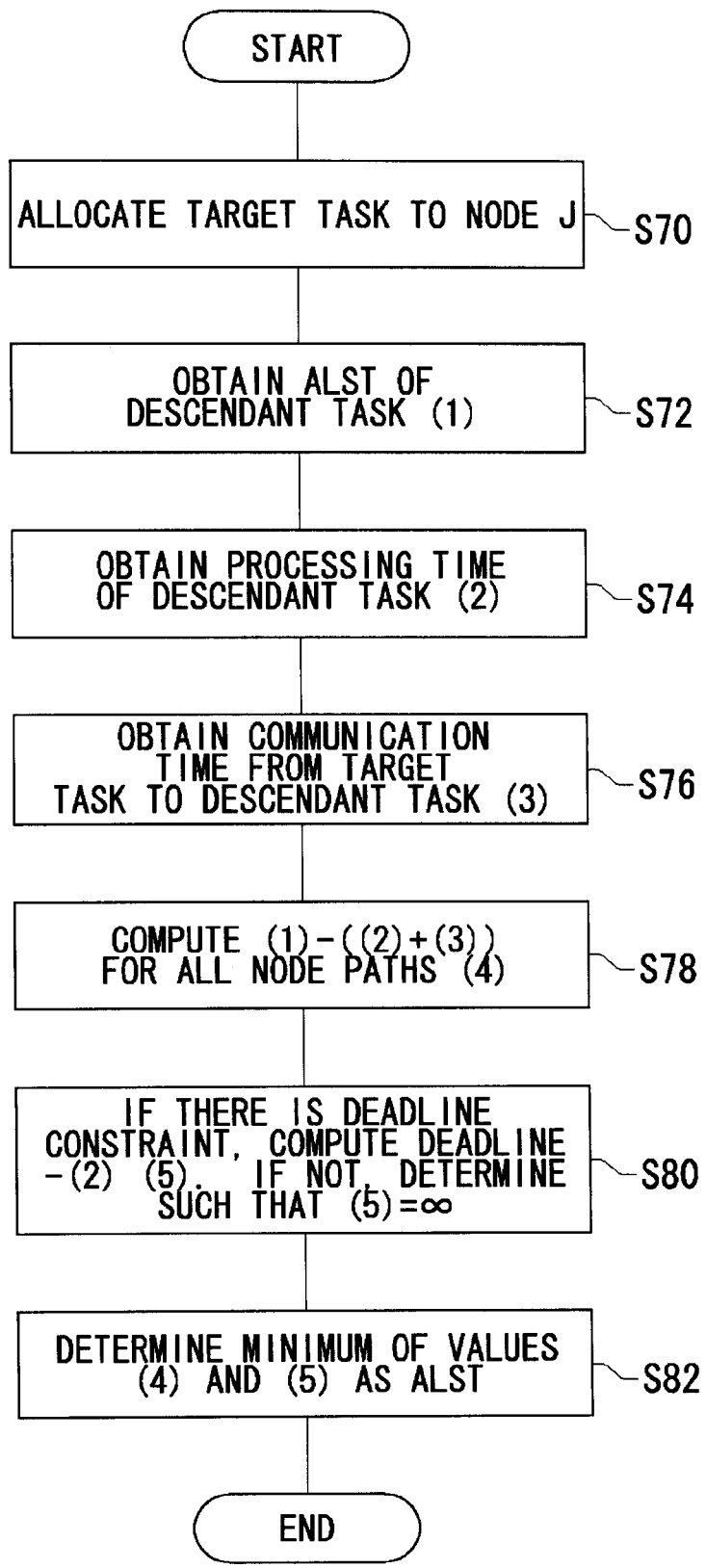
FIG. 10 is a flowchart for the process for computing the ALST.

FIG. 10 is a flowchart for the above process. First, a target task $n_i$ is tentatively allocated to a node J (S70). The start time computing unit 144 computes the ALST of a descendant task of the target task $n_i$ (S72) and obtains the processing time of the target task $n_i$ from the task information storage 120 (S74). The start time computing unit 144 also obtains the amount of data transferred between tasks from the task information storage 120 and obtains the latency and throughput from the node information storage 126. The start time computing unit 144 also computes the communication time from the target task $n_i$ to the descendant task that results when the target task $n_i$ is allocated to the node J (S76). As in the case of AEST, if the target task $n_i$ and the descendant task are located in the same node, the communication time is zero.

Subsequently, "descendant task ALST–(target task processing time+communication time)" is computed using the values computed in S72-S76 (S80). Further, the start time computing unit 144 subtracts the processing time of the target task from the deadline time (S80). A series of computation in S70-S80 is performed for all descendant tasks $n_{im}$ of the target task $n_i$. The minimum of the values computed in S78 and S80 is determined as the ALST of the target task $n_i$ (S82).

A detailed description will now be given of the steps of the flowchart of FIG. 6.

Figure 11:
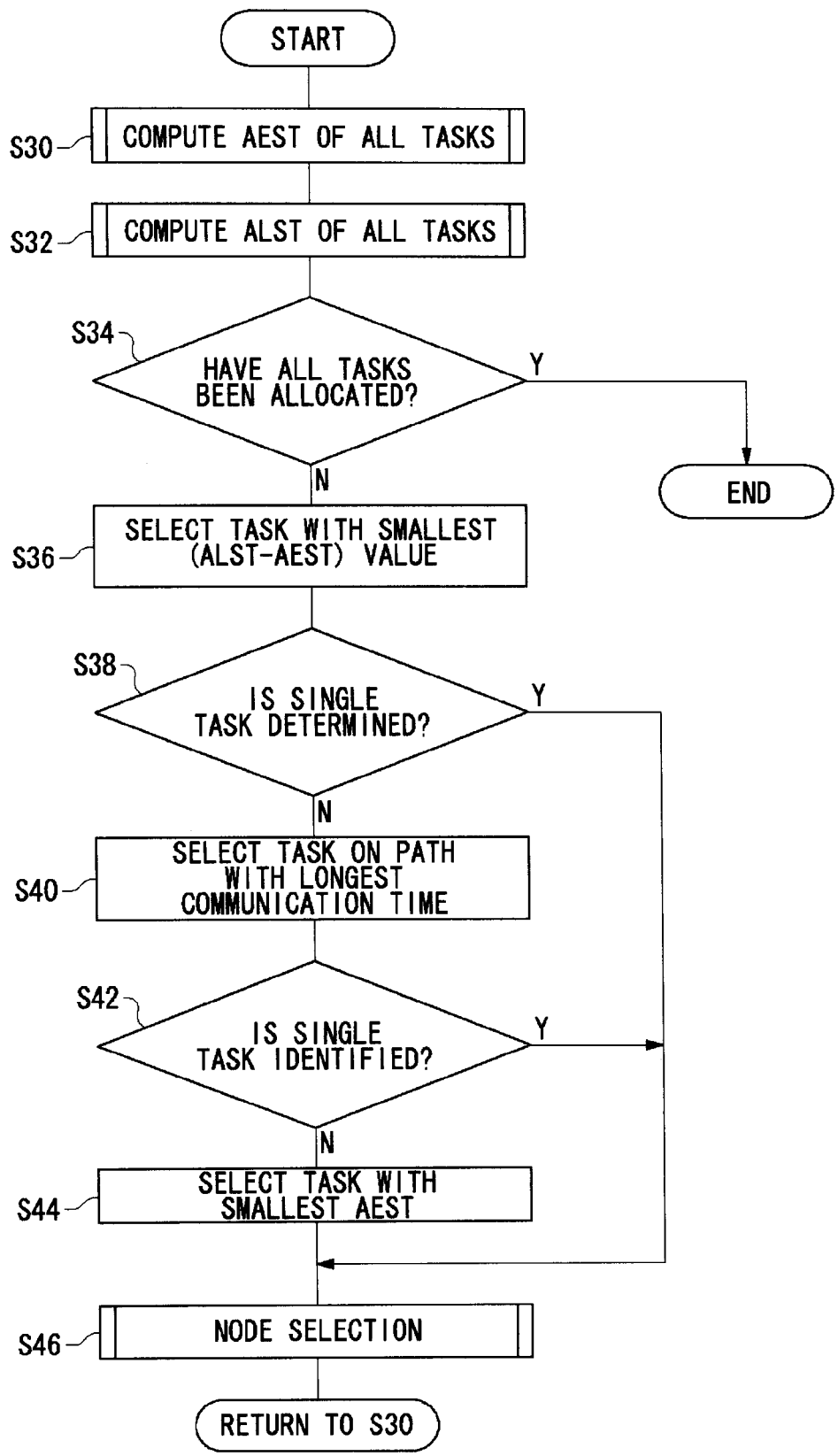
FIG. 11 is a flowchart for the task allocation of FIG. 6.

FIG. 11 is a flowchart for the task allocation steps S18 and S20 of FIG. 6. Steps S18 and S20 differ only in the target task subject to allocation. The same substeps are repeated in each of these steps. The initial state assumed herein is such that tasks without advance node designation are allocated to mutually different virtual nodes. The virtual nodes are then allocated to the actual nodes. The task allocation involves target task selection of S30-S44 and node selection of S46, which are described below.

Initially, the start time computing unit 144 computes the AEST of all target tasks according to the flowchart of FIG. 8 (S30) and computes the ALST of all tasks according to the flowchart of FIG. 10 (S32). The target task selector 146 determines whether or not all target tasks are already allocated to nodes which are not virtual nodes (S34) If the tasks are already allocated to non-virtual nodes (Y in S34), the task allocation process is terminated. If there are tasks still allocated to virtual nodes (N in S34), the target task selector 146 computes a difference between ALST and AEST (ALST–AEST) (hereinafter, referred to as "task movable range") for unallocated tasks. The target task selector 146 selects a task with the smallest task movable range (S36). If a single task is selected in S36 (Y in S38), S40-S44 are skipped. If there are plural tasks with the same task movable range (N in S38), the target task selector 146 selects a task on a path with the longest communication time from an ancestor task or to a descendant task (S40). If a single task is selected in S40 (Y in S42), S44 is skipped. If there are plural tasks with the same communication time (N in S42), the target task selector 146 selects a task with the smallest AEST value (S44) If a target task subject to allocation is determined, the node selector 148 performs a node selection process whereby the allocation target task is assigned to one of the nodes (S46). As a result of this, the AEST and ALST of the other tasks vary so that S30 and the subsequent steps are repeated.

If the tasks at both ends of a communication path, namely, the transmitting task and the receiving task are both unallocated, the communication time between tasks cannot be determined. In this case, the target task selector 146 may give priority to the receiving task (i.e., the descendant task) and select it as the allocation target task. This ensures that priority is given to task grouping described later.

The allocation process of FIG. 11 is terminated when all tasks allocated before the process to the virtual nodes (which include virtual nodes for grouping described later) have been allocated to the non-virtual nodes (see FIG. 17).

For latency and throughput used in computing the communication time between tasks in virtual nodes, predefined stationary values may be used or the average of latency and throughput across the real nodes may be used.

Summarizing the process shown in the flowchart of FIG. 11, "the most important task" is selected in accordance with the following three criteria in this embodiment.

Evaluation criterion 1: Task with the smallest difference (task movable range) between ALST and AEST Evaluation criterion 2: Task on a path with the longest task-to-task communication time if there are plural candidate tasks.

Evaluation criterion 3: Task with the smallest AEST value if there are plural tasks that are still candidates according to criterion 2.

Figure 12:
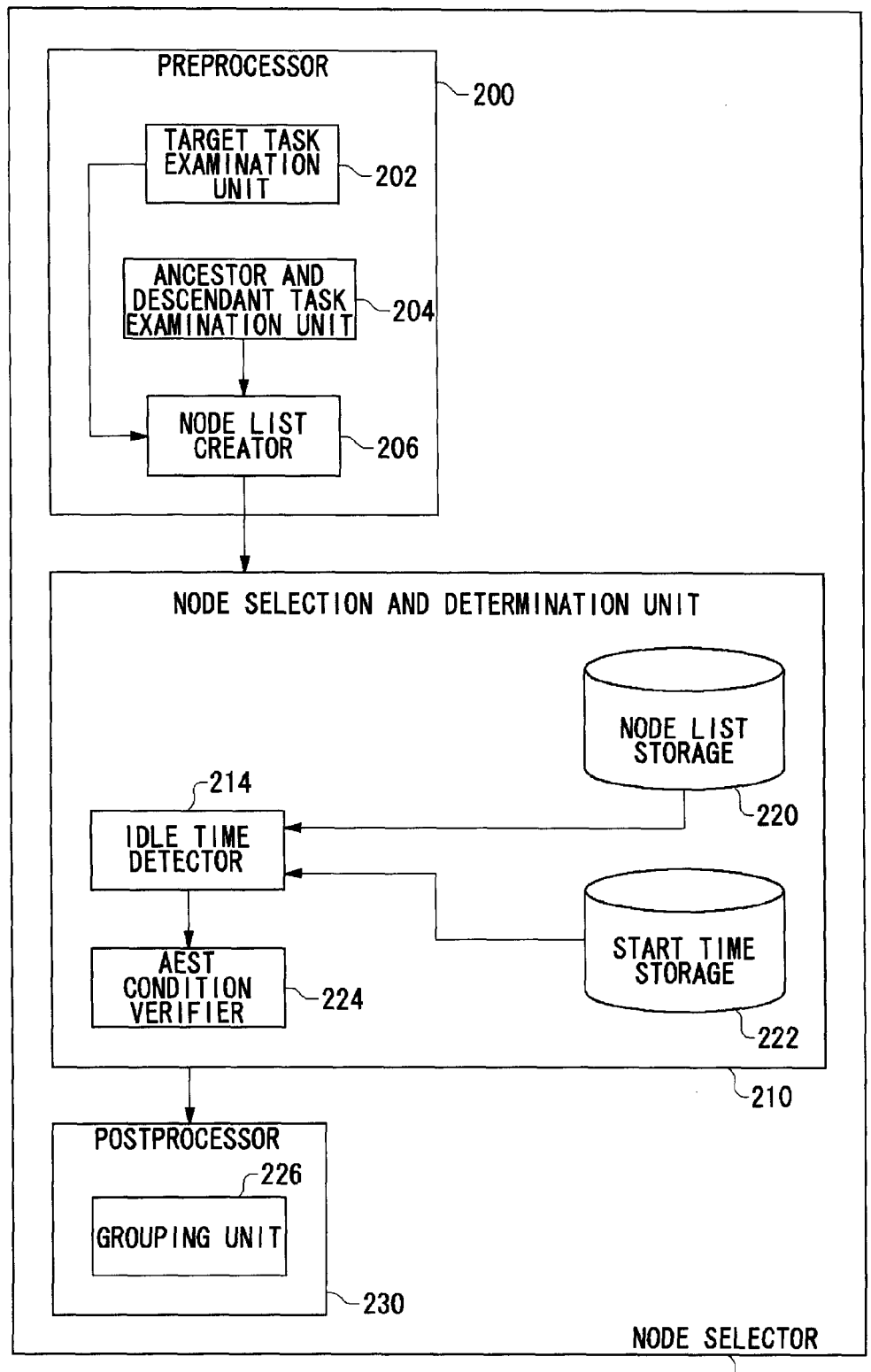
FIG. 12 is a detailed functional block diagram of a node selector.

FIG. 12 is a detailed functional block diagram of the node selector 148. The functional blocks in the figure may be implemented in a variety of manners by a combination of hardware and software.

The node selector 148 includes a preprocessor 200, a node selection and determination unit 210 and a postprocessor 230. The preprocessor 200 performs a process necessary for selection of a node to which a task is allocated. A target task examination unit 202 obtains from the storage device 130 information indicating whether the allocation target task is within a deadline time, processing time of the target task, communication time associated with the target task, and information indicating whether the target task is with advance node designation or advance group designation. An ancestor and descendant task examination unit 204 obtains information on the ancestor tasks and the descendant tasks of the target task from the storage device 130. The node list creator 206 refers to the information from the target task examination unit 202 and the ancestor and descendant task examination unit 204 so as to create a node list including information on nodes capable of accommodating the allocation target task.

The node selection and determination unit 210 selects a node to which the allocation target task is allocated, by referring to the AEST, ALST, and information prepared by the preprocessor 200, etc.

The node list created by the node list creator 206 is stored in the node list storage device 220. The AEST and ALST computed in the start time computing unit 144 of FIG. 5 are stored in a start time storage device 222.

The idle time detector 214 selects a node (hereinafter, referred to as "a candidate node") to which the allocation target task is tentatively allocated and then detects an idle time that allows execution of the allocation target task in the candidate node, by referring to the AEST and ALST stored in the start time storage device 222. More specifically, the idle time detector 214 computes the tentative AEST that results when the allocation target task is allocated to the node. If the allocation target task can be allocated to the candidate node, an assumption is made that the execution of the allocation target task is started at the tentative AEST, whereupon the earliest possible start time of the most important descendant task of the allocation target task (descendant task AEST) is obtained. The node which gives the smallest descendant task AEST is selected as the destination of allocation of the allocation target task. If there are plural candidate nodes, the one that gives the smallest tentative AEST value is given priority. The AEST condition verifier 224 determines whether the AEST computed in the idle time detector 214 meets a predefined condition.

"The most important task" is determined from the descendant tasks of the allocation target task in accordance with the evaluation criteria 1-3 given above. It should be noted that, for a difference between ALST and AEST and for AEST, values for the descendant tasks are used, but, for task-to-task communication time, the communication time from the allocation target task to the descendant task is used.

The postprocessor 230 receives the node selected by the node selection and determination unit 210 and performs necessary postprocesses. The postprocessor 230 includes a grouping unit 226 which groups tasks as necessary.

Figure 13:
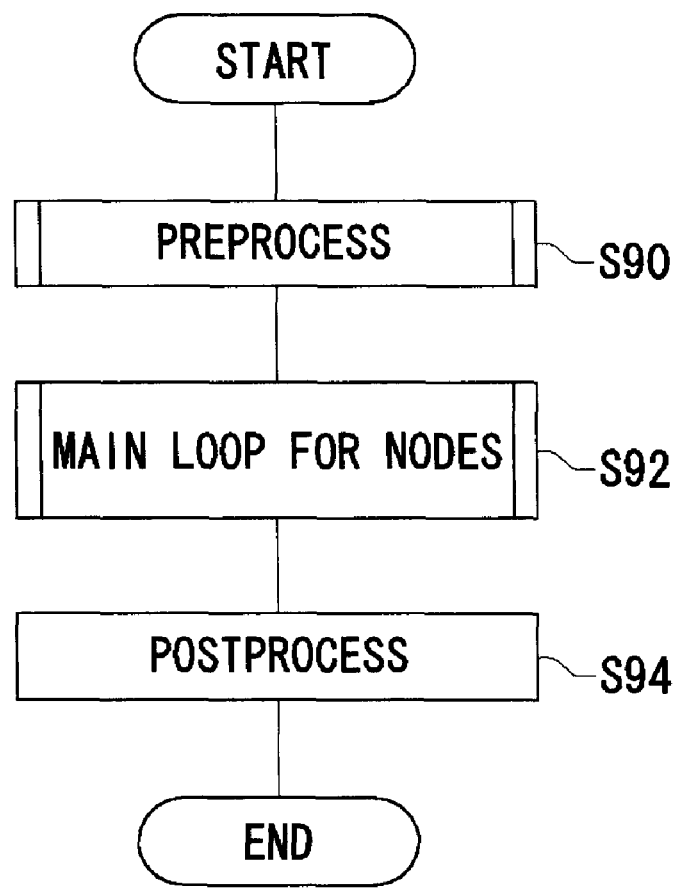
FIG. 13 is a flowchart for the node selection of FIG. 11.

FIG. 13 is a flowchart for node selection. In a preprocess, a node list listing nodes that are candidates for accommodating the allocation target task $n_i$ is created (S90). The main loop is performed for the nodes in the node list so as to select a node for accommodating the allocation target task $n_i$ (S92). In a postprocess, the allocation target task $n_i$ is allocated to the selected node. If the node is a virtual node described later, tasks are grouped (S94).

Figure 14:
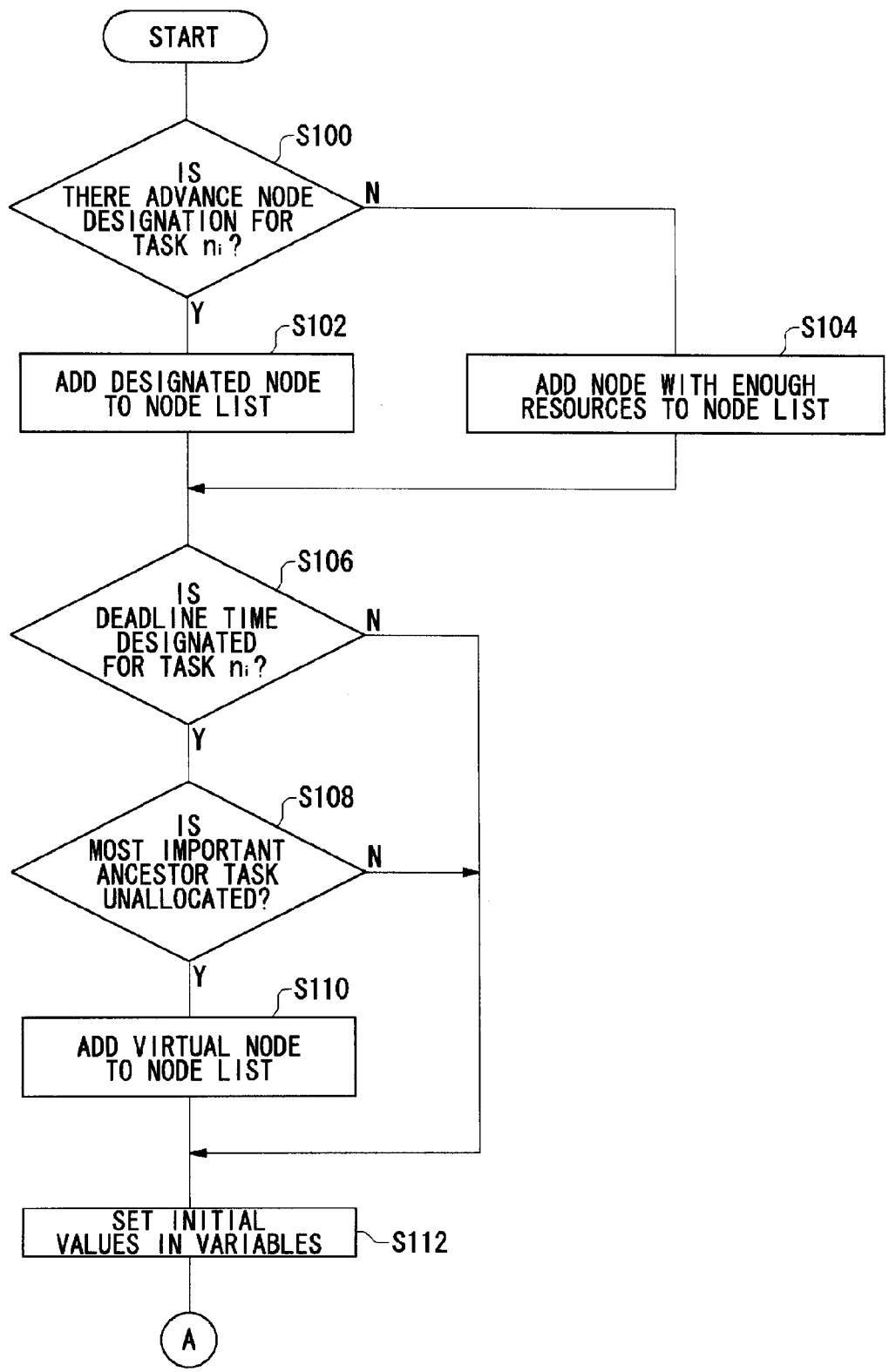
FIG. 14 is a detailed flowchart for the preprocess of FIG. 13.

FIG. 14 is a flowchart for the preprocess of S90 in FIG. 13.

The node list creator 206 determines whether a node is designated in advance for the allocation target task $n_i$ (S100). If a node is designated (Y in S100), the node is added to the list (S102). If a node is not designated (N in S100), a search is made for a node having enough resources to accommodate the allocation target task $n_i$ so as to add the identified node to the node list (S104).

The node list creator 206 then examines whether a deadline time is designated for the allocation target task $n_i$ (S106). If a deadline time is not designated (N in S106), S108 and S110 described below are skipped. If a deadline time is designated (Y in S106), a determination is then made as to whether the most important ancestor task of the allocation target task is already allocated to a node (S108). If the most important ancestor task is already allocated (N in S108), S110 is skipped. If it is not allocated (Y in S108), a virtual node is added to the node list (S110). This virtual node is used to group tasks tentatively. Initial values are set in variables used in the main loop (S112). This completes the preprocess.

"The most important task" is determined from the ancestor tasks of the allocation target task in accordance with the evaluation criteria 1-3 given above. It should be noted that, for a difference between ALST and AEST and for AEST, values for the ancestor tasks are used, but, for task-to-task communication time, the communication time from the ancestor task to the allocation target task is used.

Figure 15:
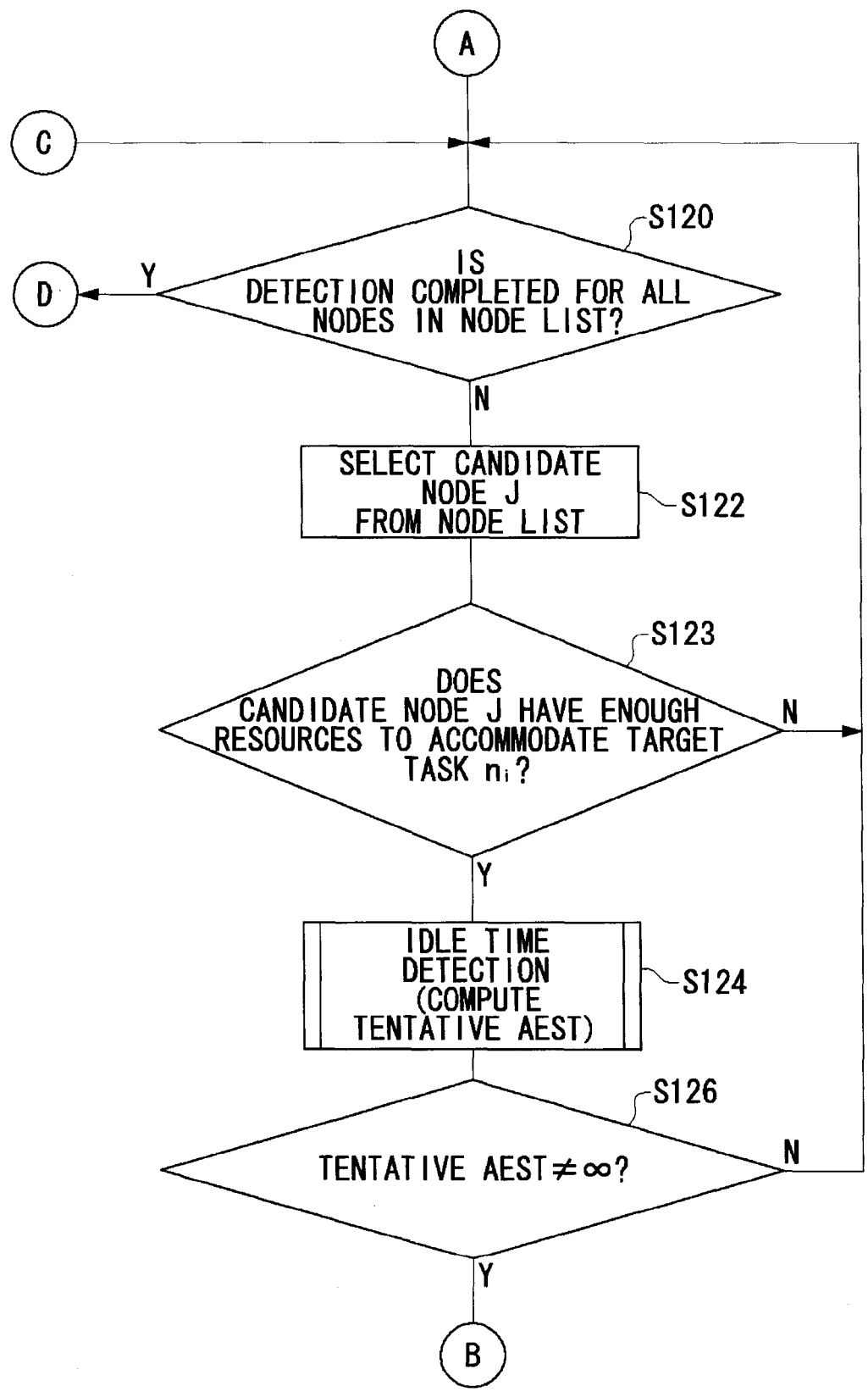
FIG. 15 is a flowchart for the main loop of FIG. 13.
Figure 16:
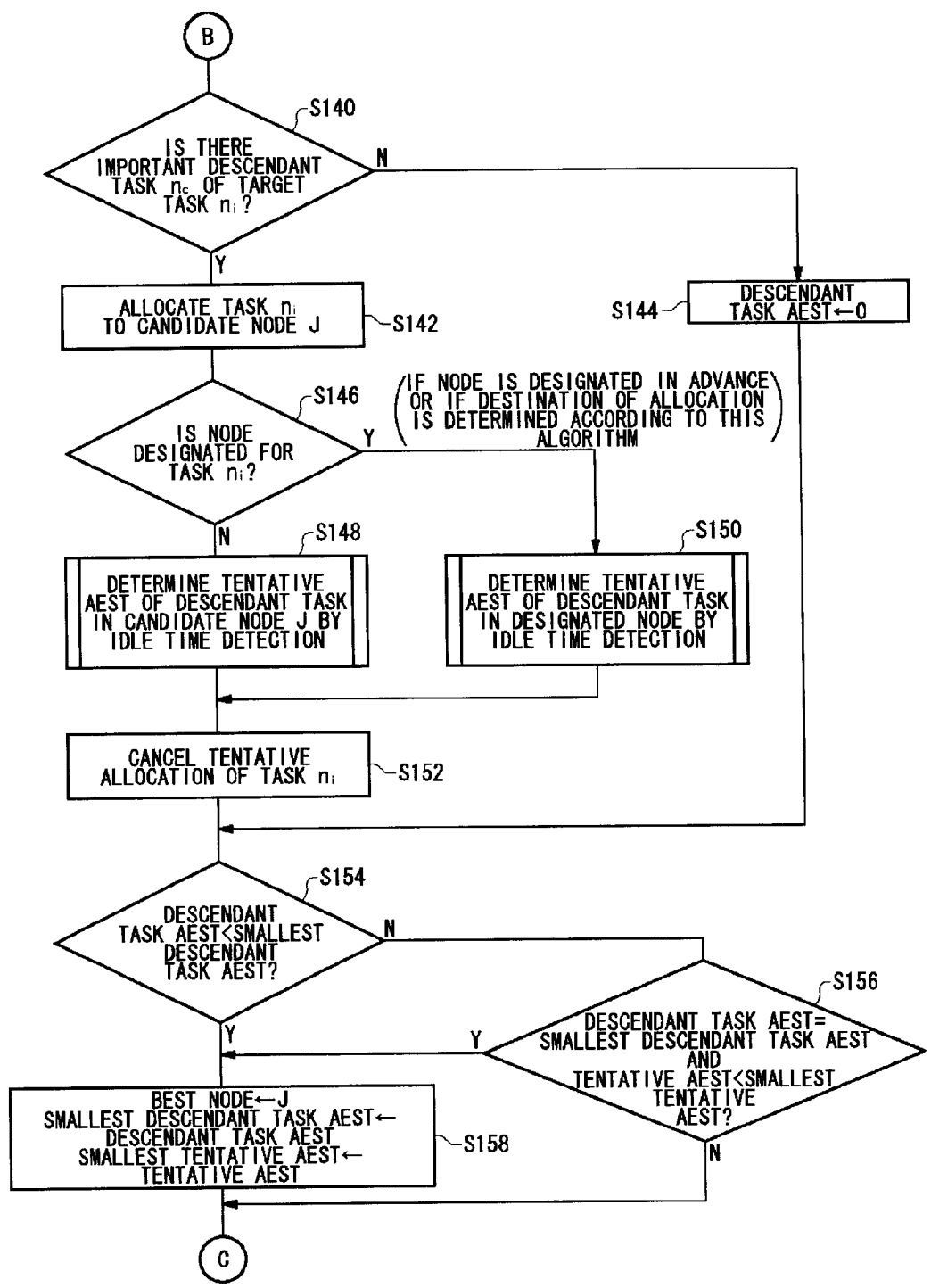
FIG. 16 is a flowchart for the main loop of FIG. 13.

FIGS. 15 and 16 are flowcharts for the main loop of S92 in FIG. 13.

An idle time detector 214 determines whether the detection is completed for all nodes in the node list (S120). If the detection is not completed, the idle time detector 214 selects a node from the node list as a candidate node J (S122) and determines whether the candidate node J has enough resources to accommodate the allocation target task $n_i$ (S123). If the candidate node J does not have enough resources (N in S123), control is returned to S120. If the candidate node J has enough resources (Y in S123), the idle time detection is performed for the node so as to determine the tentative AEST of the allocation target task $n_i$ (S124). If the tentative AEST can be computed (Y in S128), control is turned to the flow of FIG. 16. If the tentative AEST cannot be computed (Y in S128), control is returned to S120.

Turning to the flow of FIG. 16, the idle time detector 214 determines whether there is an important descendant task $n_c$ of the target task $n_i$ (S140). If there is an important descendant task $n_c$ (Y in S140), the task $n_i$ is tentatively allocated to the candidate node J (S142). The idle time detector 214 determines whether a node is designated for the task $n_c$ (S146). Node designation includes advance node designation and determination of a node according to this algorithm. If a node is not designated (N in S146), the idle time detection computes the AEST of the descendant task that results when the descendant task $n_c$ is allocated to the candidate node J (S148). If a node is designated (Y in S146), the AEST of the descendant task that results when the descendant task $n_c$ is allocated to the designated node is computed (S150) If the important descendant task $n_c$ is already allocated, the AEST of the important descendant task $n_c$ is recomputed since the value thereof changes as a result of allocating the target task $n_i$. If a node is designated in advance for the important descendant task $n_c$ and if the designated node does not have enough resources, the AEST of the important descendant task $n_c$ is set to be ∞. If there is not any important descendant task $n_c$, the AEST of the descendant task is set to be "0". Once the AEST of the descendant task is computed, tentative allocation of the allocation target task $n_i$ is canceled (S152).

The AEST condition verifier 224 determines whether the AEST of the descendant task determined in S148 or S150 is smaller than the smallest descendant task AEST (S154). For allocation of the allocation target task $n_i$, priority is given to a node that gives the smallest descendant task AEST. This is because the smaller the AEST of the descendant task, the shorter the node path and the less time required for task-to-task communication. If the descendant task AEST is smallest (Y in S154), the AEST condition verifier 224 sets the candidate node J as the best node and rewrites the smallest descendant task AEST by the current descendant task AEST. The smallest tentative AEST is rewritten by the tentative AEST of the target task (S158). Control is returned to S120 of FIG. 15, whereupon the above process is repeated for another node in the node list.

If the descendant task AEST is equal to or larger than the smallest target task AEST (N in S154), the AEST condition verifier 224 determines whether the descendant task AEST is equal to the smallest descendant task AEST and the tentative AEST is smaller than the smallest tentative AEST set in S158 (S156). If the descendant task AEST is equal to the smallest descendant task AEST and the tentative AEST is smallest (Y in S156), control is turned to S158. If the descendant task AEST is largest than the smallest descendant task AEST or if the tentative AEST value is not smallest, the target task should not be allocated to the candidate node J. Accordingly, control is returned to S120, whereupon the above process is repeated for another node.

Figure 17:
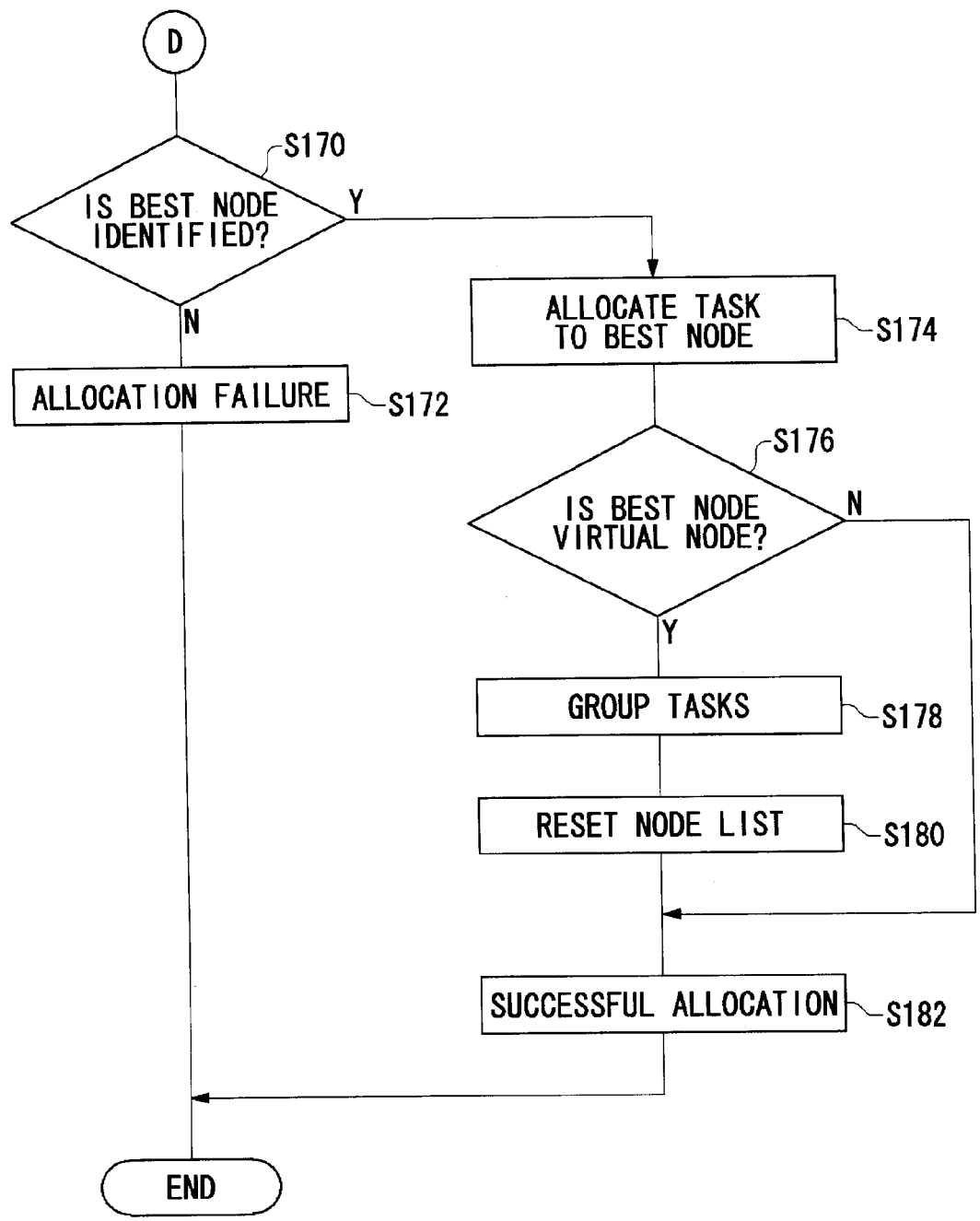
FIG. 17 is a detailed flowchart for the postprocess of FIG. 13.

FIG. 17 is a flowchart for the postprocess of S94 in FIG. 13.

If the process is completed in S120 of FIG. 15 for all nodes in the node list, control is turned to the flow of FIG. 17. The postprocessor 230 determines whether the best node is identified in the above process (S170) If the best node is not identified, namely, if the allocation destination node of the target task $n_i$ is not found (N in S170), it means that the node selection fails (S172), whereupon an appropriate follow-up process is performed. If the best node is identified (Y in S170), the allocation target task $n_i$ is allocated to the best node (S174). If the node to which the target task is allocated is a virtual node (Y in S176), the grouping unit 226 groups the associated tasks (S178) and resets the node list (S180). This completes the current node selection process (S182). If the node to which the target task is allocated is not a virtual node (N in S176), S178 and S180 are skipped.

Figure 18:
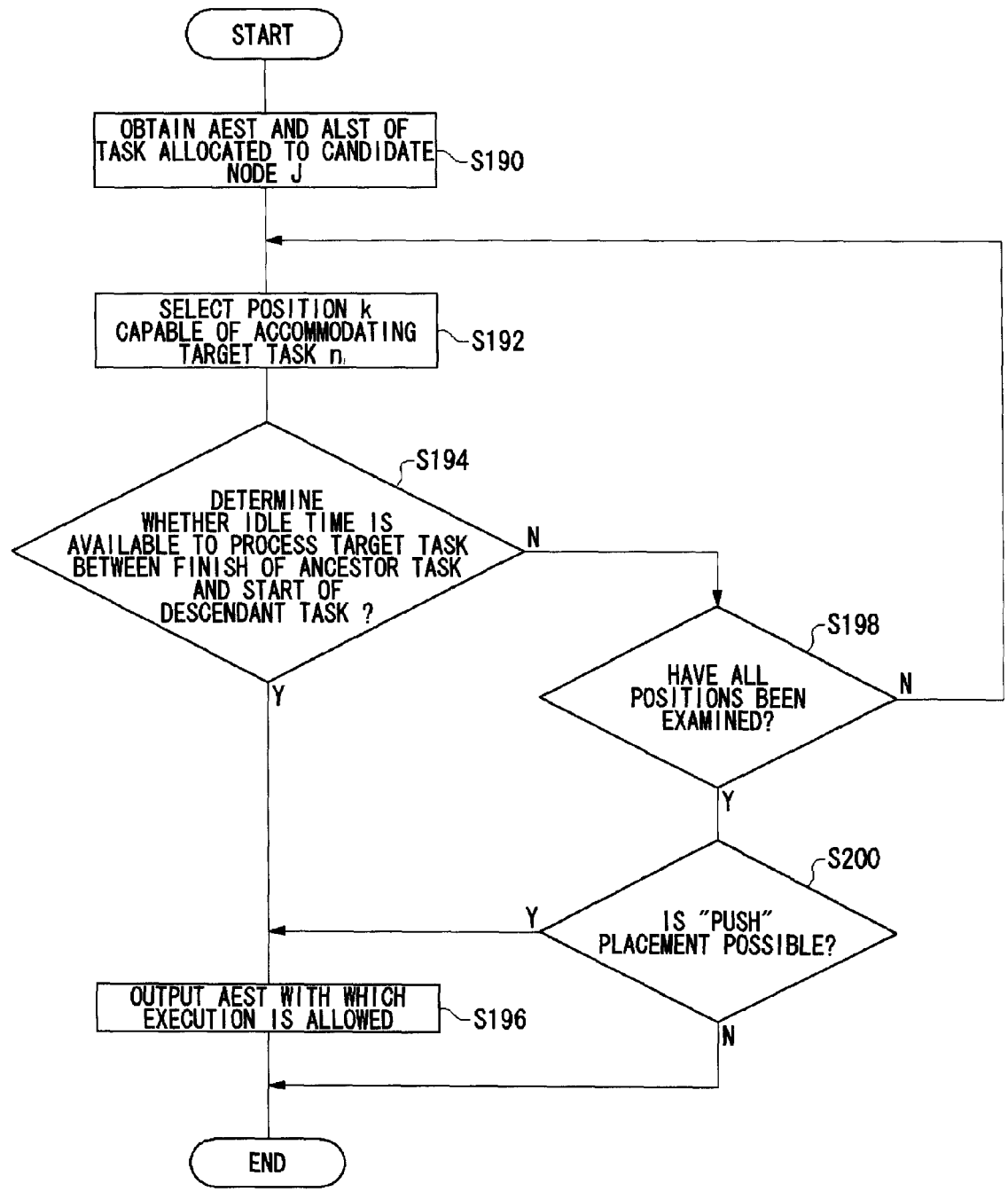
FIG. 18 is a flowchart for the idle time detection of FIG. 15 and FIG. 16.

FIG. 18 is a detailed flowchart for the idle time detection of S124 in FIG. 15 and S148 and S150 in FIG. 16. The idle time detector 214 computes the AEST and ALST for all tasks already allocated to the candidate node J (S190). The computation may be done by the start time computing unit 144. Subsequently, a position capable of accommodating the target task is selected (S192). A determination is made as to whether an idle time is available to process the target task $n_i$ between the finish time of the ancestor task and the start time of the descendant task (S194). If an idle time is available (Y in S194), the AEST of the task is output (S196) If an idle time is not available (N in S194), a determination is made as to whether all positions within the node capable of accommodating the target task have been examined (S198). If any unexamined position remains (N in S198), control is returned to S192, whereupon the unexamined position is examined. If all positions have been examined (Y in S198), a determination is made as to whether placement according to "PUSH insert" is possible (S200).

A description will now be given of PUSH insert. A determination is made as to whether the target task $n_i$ (or, all tasks within the same group, in case of grouped tasks) can be allocated to the candidate node J by delaying the ALST of the tasks already allocated to the candidate node J. That is, it is ensured that the target task is allocated to one of the real nodes, while permitting delay of the finish time of the application as a whole.

If the placement according to PUSH insert is possible (Y in S200), the AEST of the task is output (S196). If the placement according to PUSH insert is impossible (N in S200), it means that the target task cannot be allocated to the node J.

Figure 19:
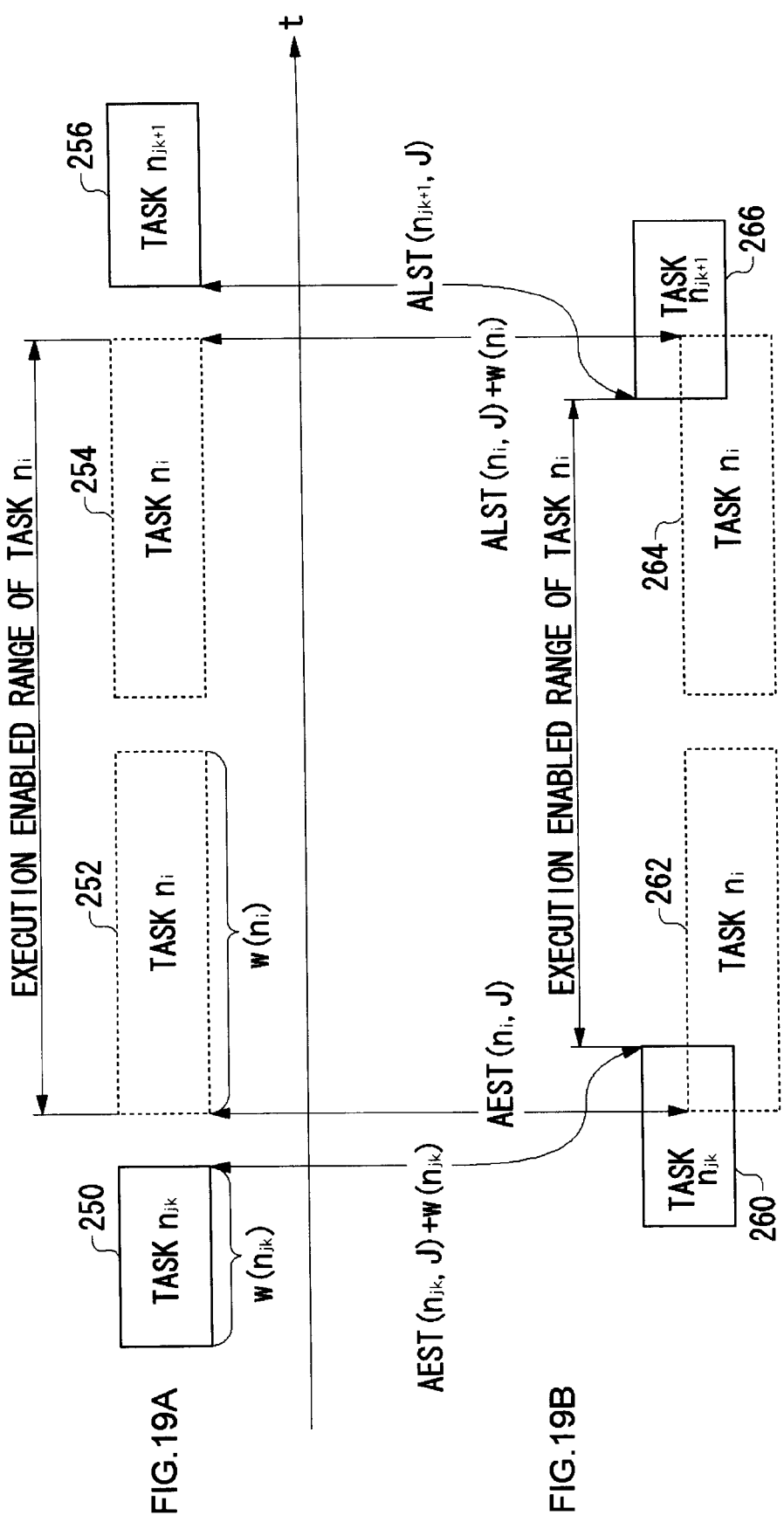
FIGS. 19A and 19B are diagrams which explain the computing method of idle time detection.

FIGS. 19A and 19B are diagrams which explain the idle time detection of FIG. 18. In the idle time detection, a determination is made as to whether the target task $n_i$ can be allocated to the candidate node J without delaying the absolute latest start time ALST of the tasks already allocated to the candidate node J.

Given that a task $n_{jk}$ and a task $n_{jk+1}$ are already allocated to the candidate node J, the idle time detector 214 determines whether the allocation target task $n_i$ can still be accommodated. In this process, it is ensured that an ancestor task of the target task $n_i$ is not located after the insertion position of the target task $n_i$ (between the task $n_{jk}$ and the task $n_{jk+1}$) and a descendant task of the target task $n_i$ is not located before the insertion position.

The finish time of the task $n_j$ is given by $\{ALST(n_j,J)+w(n_j)\}$, using the ALST and the processing time of the task $n_j$. The absolute earliest start time of the task $n_j$ is given by $AEST(n_j,J)$. Accordingly, the allocation target task can be placed between the task $n_{jk}$ and the task $n_{jk+1}$ if a "task execution enabled range", which is a difference between the finish time of the task $n_{jk}$ and the start time of the task $n_{jk+1}$, is equal to or larger than the processing time of the target task $n_i$. Therefore, the placement is permitted if the following expression holds.

$$\min\{ALST(n_i,J)+w(n_i),ALST(n_{jk+1},J)\}-\max\{AEST(n_i,J),AEST(n_{jk},J)+w(n_{jk})\}-(AEST(n_i,J)-ALST(n_i,J))\geqq w(n_i) \quad (10)$$

The first term indicates that a comparison is made between the latest start time of the task $n_{jk+1}$ and the latest possible finish time of the target task $n_i$ so that the earlier of the two is selected. The second term indicates that a comparison is made between the absolute earliest start time of the target task $n_i$ and the earliest possible finish time of the task $n_{jk}$ so that the later of the two is selected. If a difference between these is longer than the processing time of the target task $n_i$, it is possible to place the target task $n_i$ between the task $n_{jk}$ and the task $n_{jk+1}$. If the difference is smaller than the processing time of the target task $n_i$, it is impossible to place the target task $n_i$ in between. The third term represents correction based on a difference in time reference used in the first term and in the second term. In other words, the third term is necessary because reference time of each task such that AEST=0 or ALST=0 is variable depending on the node where the task is allocated.

If the allocation is possible, the idle time detector 214 returns the earliest AEST which allows accommodation of the target task $n_i$. If the allocation is impossible, the placement according to the "PUSH insert" described above is considered.

A further explanation will be given with reference to FIGS. 19A and 19B. For the sake of simplicity, the third term of the equation (10) is not considered in FIGS. 19A and 19B. In the case of FIG. 19A, since the absolute earliest time $AEST(n_i,j)$ of the target task $n_i$ is later than the finish time $AEST(n_{jk},J)+w(n_{jk})$ of the task $n_{jk}$, the absolute earliest time of the target task $n_i$ is employed. Since the finish time $ALST(n_i,J)+w(n_i)$ of the target task $n_i$ is earlier than the absolute latest start time $ALST(n_{jk+1},J)$ of the task $n_{jk+1}$, the finish time of the target task $n_i$ is employed. Therefore, the execution enabled range of the target task $n_i$ in this case is given as follows.

$$(\text{execution enabled range})=\{ALST(n_i,J)+w(n_i)\}-AEST(n_i,J) \quad (11)$$

In the case of FIG. 19B, since the finish time $AEST(n_{jk},J)+w(n_{jk})$ of the task $n_{jk}$ is later than the absolute earliest time $AEST(n_i,j)$ of the target task $n_i$, the finish time $AEST(n_{jk},J)+w(n_{jk})$ of the task $n_{jk}$ is employed. Since the absolute latest start time $ALST(n_{jk+1},J)$ of the task $n_{jk+1}$ is earlier than the finish time $ALST(n_i,J)+w(n_i)$ of the target task $n_i$, the ALST of the task $n_{jk+1}$ is employed. Therefore, the execution enabled range of the target task $n_i$ in this case is given as follows.

$$(\text{execution enabled range})=ALST(n_{jk+1},J)-\{AEST(n_{jk},J)+w(n_{jk})\} \quad (12)$$

Figure 20:
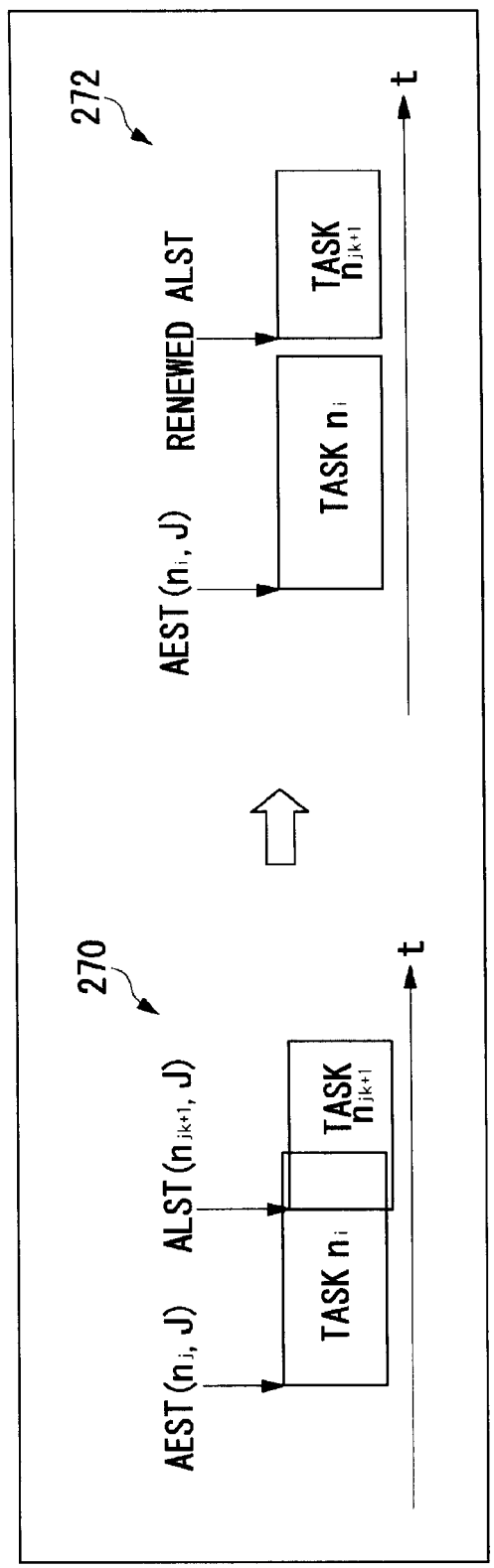
FIG. 20 illustrates the "PUSH insert" of S200 in FIG. 18.

FIG. 20 illustrates the "PUSH insert" of S200 in FIG. 18. As indicated by a block 270 on the left of FIG. 20, the target task $n_i$ may not be accommodated in the node J without resulting in the processing time of the target task $n_i$ overlapping that of the task $n_{jk+1}$ within the execution enabled range of the target task $n_i$. In this case, as indicated by a block 272 on the right of FIG. 20, the idle time detector 214 accommodates the target task $n_i$ by changing the ALST of the task $n_{jk+1}$ and delaying the start time of the task $n_{jk+1}$. This will delay the finish time of the application as a whole.

As described above, the idle time detection is performed such that the target task and the most important descendant task (i.e., the task which is among the descendant tasks still allocated to virtual nodes and which is characterized by the smallest difference between AEST and ALST) are tentatively allocated to nodes. Then, the node which gives the smallest descendant task AEST is selected as the destination node of allocation of the target task. This ensures that the destination node to which the target task is allocated is selected by looking ahead the allocation of the task which is one step descendant from the target task. Consequently, situations are avoided where the AEST of the target task comes early but the AEST of the descendant task comes late, prolonging the overall processing time.

Example

A description will now be given of specific examples of how tasks are actually allocated to nodes by applying the steps described in the described embodiment.

Figure 21:
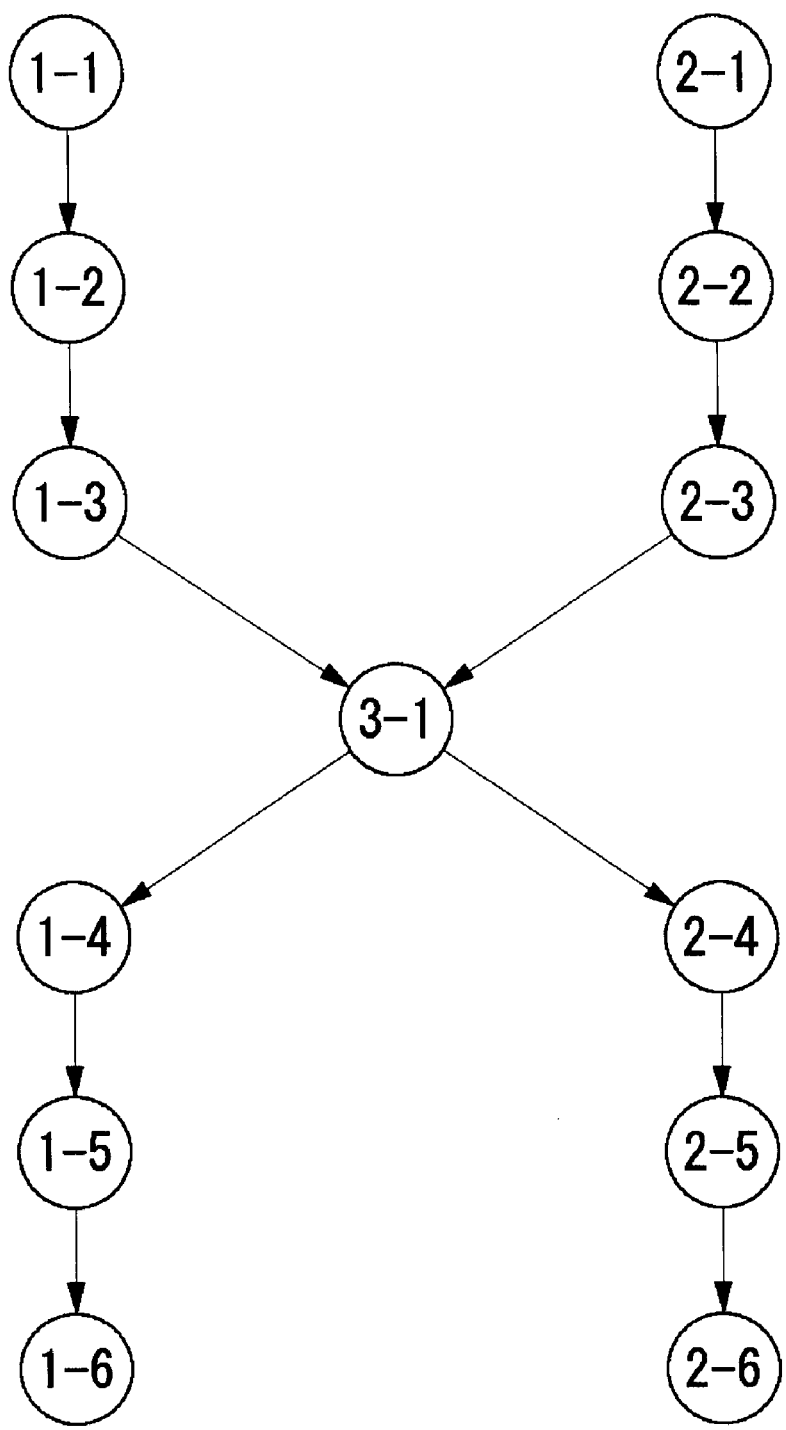
FIG. 21 shows a specific example of task path subject to task allocation.

A description will be given of processing tasks in antecedent-dependent relation shown in FIG. 21 in the distributed application system shown in FIG. 1 including five nodes. Referring to FIG. 21, numerals inside blank circles denote a set of "player ID and a task ID". For example, "1-1" denotes the "first task of the player 1". Referring to FIG. 21, tasks related to the player 1 include "1-1"-"1-6", and tasks related to the player 2 include "2-1"-"2-6". "3-1" denotes a task which should be executed in a single node for both players. As mentioned before, an example of such a task is collision determination in a beat'-em-up game application.

A node 1 is designated in advance for the tasks "1-1" and "1-6". A node 5 is designated in advance for the tasks "2-1" and "2-6". These are tasks like key input by a controller and screen display that should be executed only in the associated player's nodes. It is also assumed that a node 4 is designated for the task "3-1".

A deadline time of 200 ms is preset for a path of the player 1, and 250 ms for a path of the player 2.

For brevity, the latency is uniformly assumed to be 5 ms and throughput to be 100 Mbps for the purpose of computing the communication time between tasks. It is also assumed that the nodes have enough computing resources.

Figure 22:
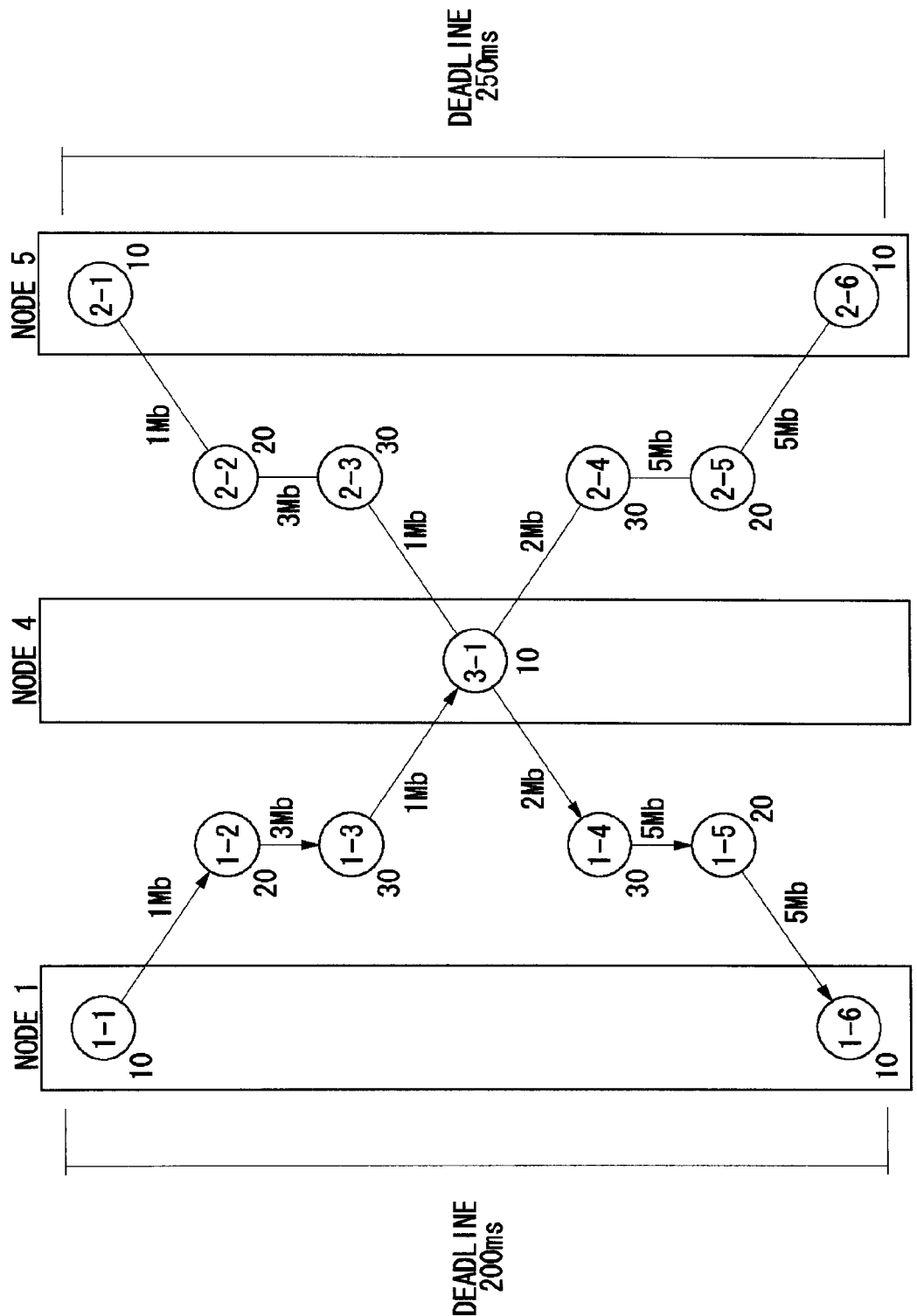
FIG. 22 is a task graph showing task processing time, communication time, and advance node designation.

Initially, the information collector 108 obtains the processing time of the tasks, latency, throughput and amount of transferred data. FIG. 22 shows the relationship between tasks occurring after the information has been obtained. Numerals in the figure represent the obtained information. Numerals to the left and below the blank circles denote the processing time of the tasks. Numerals beside the arrows represent the amount of transferred data. The communication time between tasks is computed such that "latency+(throughput×amount of transferred data)".

Subsequently, tasks for which nodes are designated in advance are allocated to the respective nodes. In this process, the antecedent-dependency between the tasks is naturally taken into consideration. The amount of resources available in the nodes is also examined as necessary.

Tasks without advance node designation are then allocated to virtual nodes. The start time computing unit 144 computes the AEST and ALST of the tasks. The computation is in accordance with the expressions given above and uses the deadline time, task processing time and communication time mentioned above. For example, subtracting the processing time (=10 ms) of the task 2-6 from the deadline time (=250 ms) yields the ALST of the task 2-6 (=240 ms). Subtracting the communication time (=50 ms) to transmit 5 Mb, the latency (=5 ms) and the processing time (=20 ms) of the task 2-5, from the ALST (=240 ms) of the task 2-6 yields the ALST of the task 2-5 (=165 ms). The ALST is computed similarly for the other tasks. Two ALST values are computed for the task 3-1, namely on a left path leading from the task 1-6 and a right path leading from the task 2-6. In this case, the smaller of the two (=−5 ms), which is obtained on the left path, represents the ALST of the task 3-1.

The AEST values are computed by successively adding the task processing time and the communication time to the AEST values of the task 1-1 and the task 2-1, which are zero. For example, adding the processing time of the task 1-1 (=10 ms), the communication time to transmit 1 Mb (=10 ms) and the latency (=5 ms) yields the AEST of the task 1-2 (=25 ms). The AEST of the other tasks are computed similarly.

Subsequently, the task movable range defined by (ALST−AEST) is computed. The table of FIG. 23 shows the results of computing the AEST, ALST and task movable range.

Control proceeds to node selection. Of the most time stringent tasks, i.e., the tasks with the smallest task movable range (−130 ms), the task on a path with the longest communication time is identified. As can been seen in FIG. 23, the path (hereinafter, referred to as a path A) between the task 1-4 and the task 1-5 and the path (hereinafter, referred to as a path B) between the task 1-5 and the task 1-6 meet the criteria. Since the communication time (=55 ms) on the path A is equal to that of the path B, the AEST of the descendant task is examined. A comparison between the AEST (=245 ms) of the descendant task 1-5 on the path A and the AEST (=320 ms) of the descendant task 1-6 on the path B shows that the AEST of the task 1-5 is smaller. Therefore, priority is given to the placement of the task 1-5.

Alternatively, the following procedure may be employed to determine a target task if the communication time along the path A (=55 ms) is equal to that of the path B. Since the tasks 1-4 and 1-5 on the path A are both unallocated, the descendant task 1-5 is tentatively determined to be a candidate for allocation in order to give priority to grouping. Since the task 1-6 on the path B is already assigned, the task 1-5 is determined to be a candidate for allocation. Therefore, priority is given to the placement of the task 1-5.

Idle time detection is then performed so as to determine the best node, descendant task AEST and tentative AEST of the task 1-5. In an initial state, the ancestor task 1-4 of the task 1-5 is unallocated. Therefore, a virtual node 0 is assumed to which only the task 1-4 is allocated. At this point of time, the best node of the task 1-5 is of null value. The descendant task AEST and the tentative AEST are ∞. The node list contains a total of six nodes, which include the virtual node 0 and the nodes 1-5, are registered as possible destinations of allocation of the task 1-5. First, the task 1-5 is tentatively allocated to the virtual node 0 at the top of the list. Computing the expression (2) above, the tentative AEST of the task 1-5 is 190 ms when it is allocated to the virtual node 0.

The task 1-6 is selected as the important descendant task $n_c$. Given that the task 1-5 is tentatively allocated to the virtual node 0, the AEST of the task 1-6 would be 265 ms.

Thus, the descendant task AEST (265 ms)< smallest descendant task AEST (∞) so that the virtual node "0" is tentatively identified as the best node. "265" is substituted into the smallest descendant task AEST and "190" is substituted into the smallest tentative AEST.

Computation as described above is repeated for the remaining nodes 1-5. When J=1, the descendant task AEST is equal to 265 ms and the tentative AEST is 245 ms so that the node 0 remains the best node. This same thing is true of J=2-5.

Thus, unlike the DCP method, the inventive method gives priority to a node which gives the smallest descendant task AEST. If two or more nodes give the same descendant task AEST, the node that gives the smallest tentative AEST is given priority.

Figure 24:
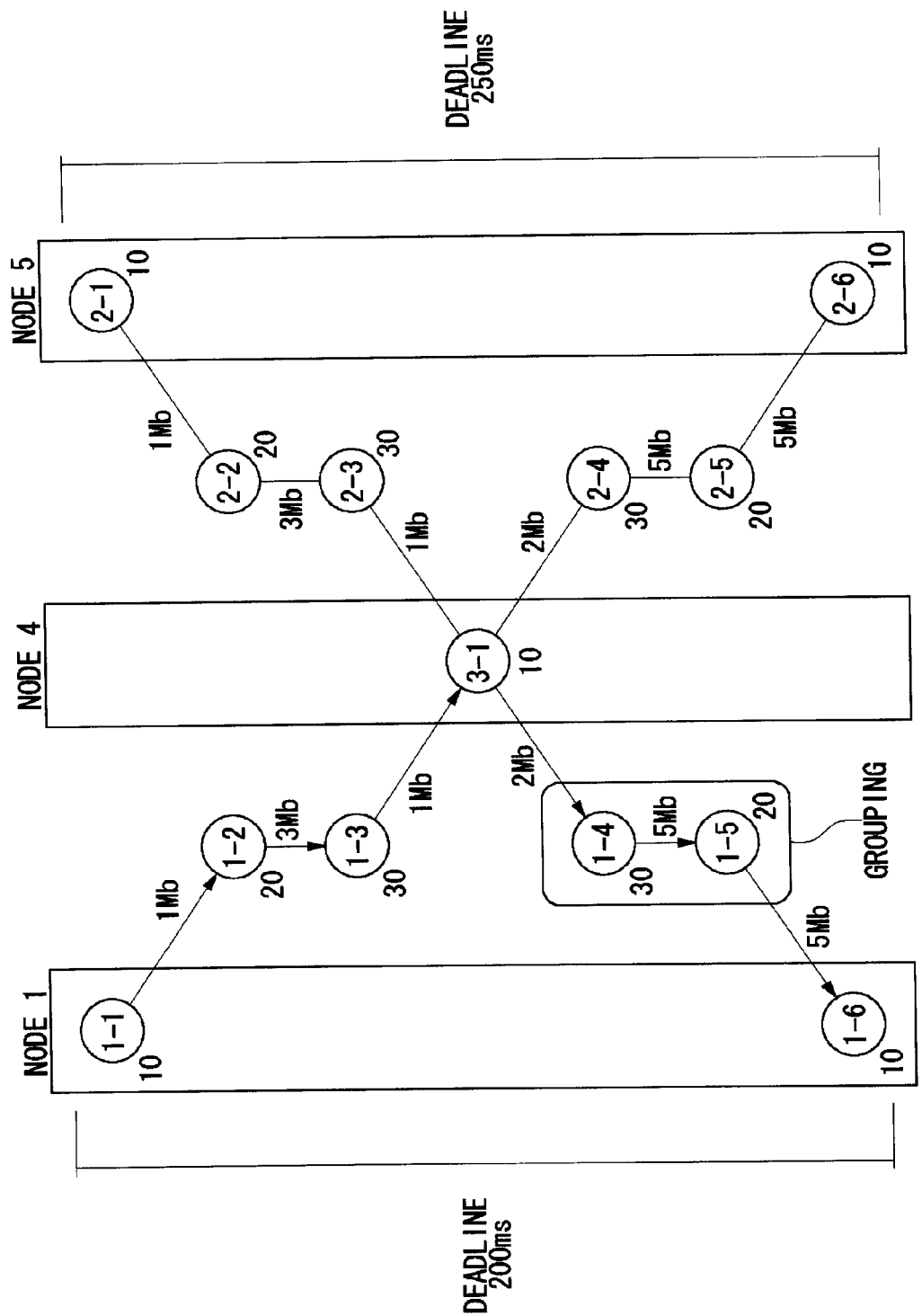
FIG. 24 is a task graph which results after a task 1-4 and a task 1-5 are grouped.

The best node is thus determined to be the node "0" so that the task 1-5 is allocated to the virtual node 0. In other words it is determined that the task 1-5 should be allocated to the same node as the task 1-4, and the tasks 1-4 and 1-5 are grouped (see FIG. 24. The grouped tasks are assumed to be a single task in the subsequent steps of computation. That is, the communication time between the tasks within the same group is assumed to be zero so that addition only involves the processing time of the tasks.

Once 1-4 and 1-5 are grouped, the AEST and ALST of all tasks are updated. Since the communication time between the tasks 1-4 and 1-5 becomes zero as a result of grouping these tasks and accommodating them in the same node, the updating of the AEST and ALST is necessitated. The AEST, ALST and task movable range of the tasks subsequent to the updating are shown in FIG. 25.

The table shows that the tasks with the task movable range of −80 ms are now targets of allocation. The path between the task 2-4 and the task 2-5 and the path between the task 2-5 and the task 2-6 are identified as the paths with the longest communication time (=55 ms). The node for the task 2-5 is selected as described above. As a result, the tasks 2-4 and 2-5 are grouped.

Figure 26:
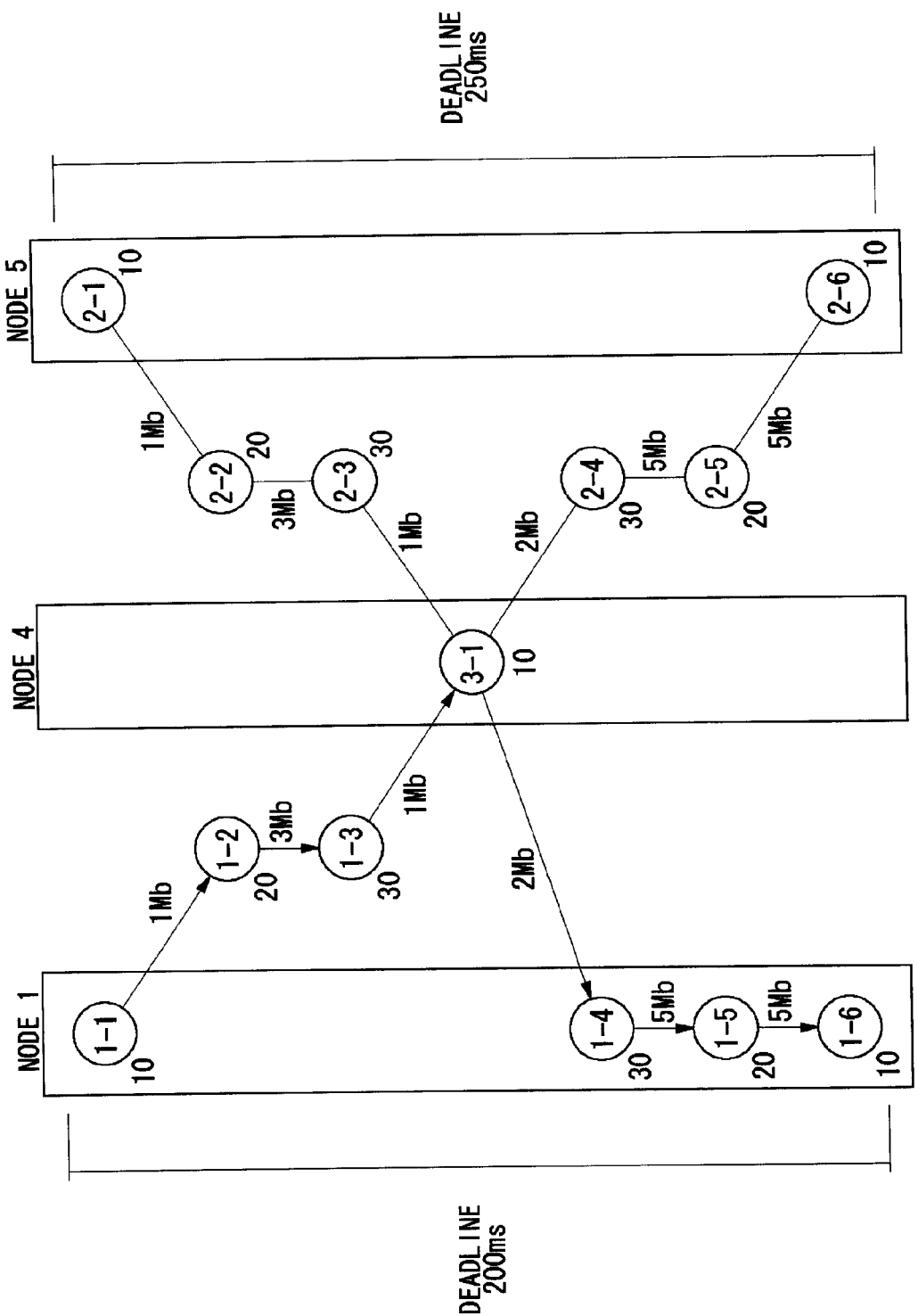
FIG. 26 is a task graph which results after tasks 1-4, 1-5 and 1-6 are allocated to a node 1.

Subsequently, computation is performed on the group comprising the tasks 1-4 and 1-5. The result of computation shows that the tasks 1-4, 1-5 and 1-6 should be in the same group. It will be noted that the node 1 is designated in advance for the task 1-6. Accordingly, it is determined that the tasks 1-4, 1-5 and 1-6 should be allocated to the task 1 (see FIG. 26).

Figure 27:
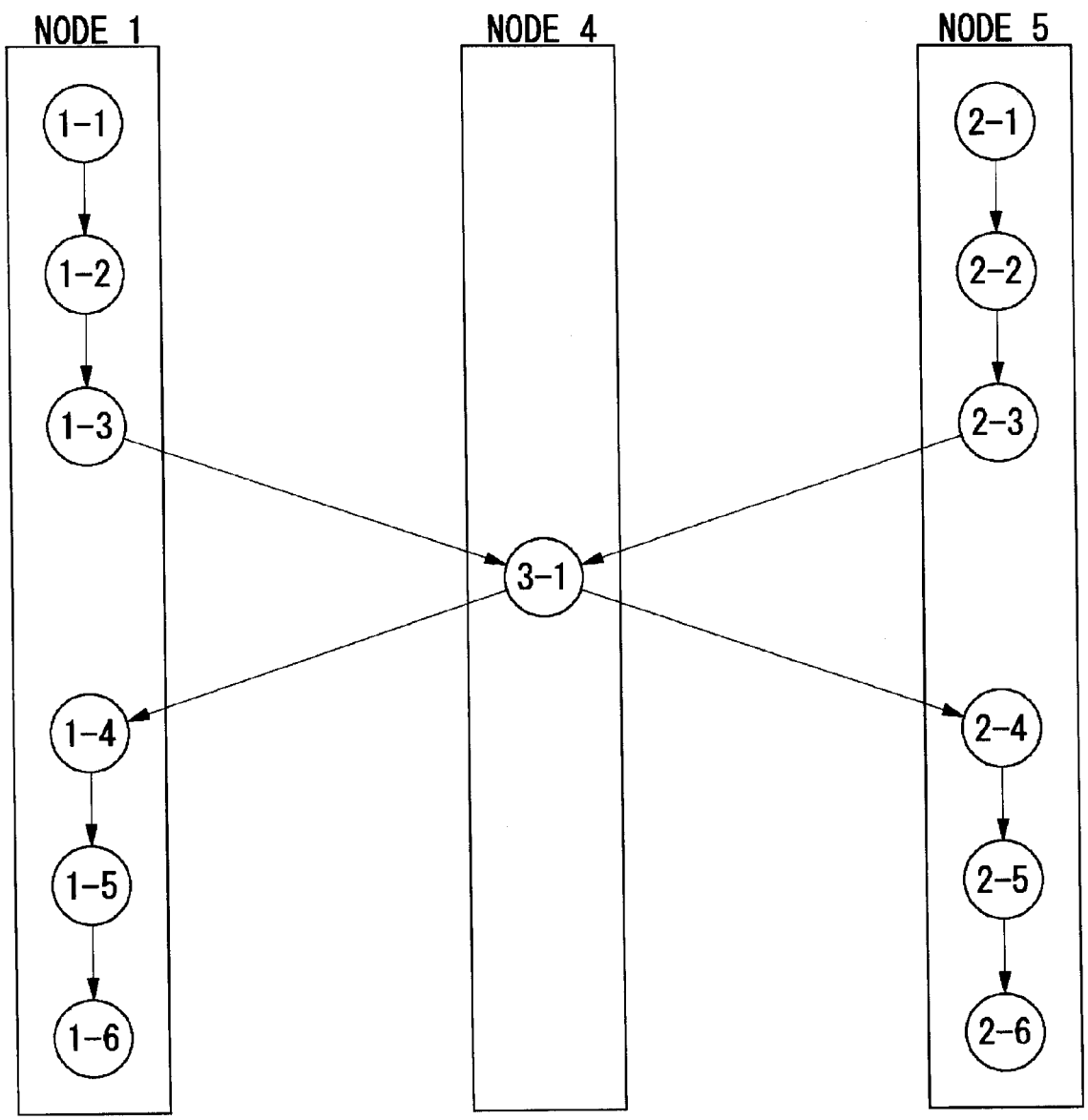
FIG. 27 is a task graph which results after task allocation.

By repeating the computation as described above, the tasks are ultimately allocated to the respective nodes as shown in FIG. 27.

As described above, according to the embodiment, the task with the minimum task movable range, which is a difference between the absolute earliest start time AEST and the absolute latest start time ALST, is given priority for allocation to a node. In allocating tasks to nodes, the task on an important path, i.e., the path with the longest communication time between tasks, is given priority. This can efficiently reduce a delay in communication. Since priority is given to important tasks, consumption of resources by less important tasks is prevented, ensuring that resources necessary for task execution are secured.

In computing the absolute earliest start time ALST, consideration is given to the deadline time of the task. This allows the absolute earliest start time ALST to be computed by considering the time margin allowed for completion of the task.

By performing task allocation, the computing resources (e.g., CPU time and memory capacity) can be shared between the plural nodes within the network. This results in a system which exhibits more than the total performance of individual devices.

Conventionally, a server dedicated to the task of collision determination is provided in, for example, a beat'-em-up game in a distributed network environment. This approach is likely to suffer from a relatively long delay time due to communication between the server and the node. As more players continue to participate in the game, the amount of computation for collision determination will also increase, necessitating the upgrading of the server.

In contrast, the method and apparatus of the embodiment do not resort to a dedicated server and all computation is done on the nodes. Therefore, there is no need to consider upgrading a dedicated server.

Employing the approach of the embodiment also enables realtime processing in a parallel system or a distributed system.

Conventionally, real time task sharing between nodes has been impossible if the number of nodes located in a network, performance of the nodes and configuration of the network are unknown, or in a distributed network environment in which the number of nodes is increased or decreased while an application is being executed. In contrast, the method and apparatus of the embodiment continue to allocate tasks properly even when the configuration of the network varies as a result of changing the connection between nodes or when a node is added or removed. This is achieved by processing information on the nodes.

Further, the method and apparatus of the embodiment allow advance designation of a node to which a specific task should be allocated. This can ensure that tasks such as key input, audio output and image output that should be executed in a specific node responsible for a specific user are allocated properly.

It is also possible to group tasks with the same context data used across plural tasks and accommodate them in the same node. This can reduce the volume and frequency of communication and minimize the effects from communication delay.

Thus, the method and apparatus of the embodiment can deal with tasks of many types and characteristics, by taking advantage of advance node designation.

In comparison with the related-art method, the method of the embodiment might require a larger amount of computation. However, because of increased flexibility in selecting nodes to which tasks are allocated, which is exemplified by the various features described, the method of the embodiment can achieve task placement capable of completing the whole process earlier than according to the related-art method.

The description of the invention given above is based upon one embodiment. The embodiment of the present invention is only illustrative in nature and it will be obvious to those skilled in the art that various variations in constituting elements and processes are possible and that such variations are within the scope of the present invention.

Optional combinations of the aforementioned constituting elements, and implementations of the invention in the form of methods, apparatuses, systems computer programs, recording mediums, etc. may also be practiced as additional modes of the present invention. The method depicted in the flowchart encompasses a process in which the steps are performed in parallel or individually as well as the steps performed sequentially in the illustrated order.

If the series of steps of the embodiment are to be executed by software, the execution may be achieved by operating a computer in which a program embodying the software is built in dedicated hardware. Alternatively, the execution may be achieved by installing the software in a general-purpose computer from a network or a recording medium, wherein the computer is capable of executing various functions by installing various programs in the computer.

The described embodiment is directed to a distributed application execution environment in which plural nodes are connected via a network. The present invention is equally applicable to a "parallel application execution environment" in a multiprocessor system in which plural processors are hosted by a node and in which the processors share the processing load. In this case, the same algorithm as described can be employed by replacing the latency and throughput between nodes in a distributed environment by those of the processors within the node.

The invention is also applicable to an environment in which the nodes in the multiprocessor system are connected via a network. In this case, the same algorithm as described can be employed by appropriately setting the latency and throughput between plural processors located within a node and the latency and throughput to processors in a different node.

What is claimed is:

1. A task allocation method for allocating a plurality of tasks, which include those tasks that are dependent on each other, to respective nodes in communication with one another in a distributed processing system, each node provided with at least one processor, the method comprising:
   determining antecedent dependency between the plurality of tasks;
   obtaining respective time constraints imposed on the plurality of tasks;
   computing an absolute earliest start time at which one or more of the plurality of tasks can be started and an absolute latest start time allowed in order to complete the one or more tasks within the respective time constraints imposed on the plurality of tasks;

computing respective task movable ranges for the one or more tasks based on a subtraction of the absolute earliest start times from respective absolute latest start times for the one or more tasks;

selecting initially a group of tasks having smaller task movable ranges from the one or more tasks, for allocation to the respective nodes within the distributed processing system;

selecting at least one task from the group of tasks for allocation to at least one destination node based on the determined dependency when all tasks within the group of tasks have same task movable range wherein the at least one task has a longer data communication time with a precedent or a descendant task;

allocating the at least one task to the destination node among the nodes of the distributed processing system, giving priority to those tasks having smaller task movable ranges wherein, if a plurality of target tasks have a same data communication time to communicate with the descendant task, allocating the target task to the destination node on a priority basis based on the absolute earliest start time of a most important descendant task descendant from the target task, the most important descendant task being a task with the smallest absolute earliest start time.

2. The task allocation method according to claim 1, wherein, for at least a part of the tasks, advance designation of a node for accommodating a task is acknowledged.

3. The task allocation method according to claim 2, further comprising allocating tasks without advance node designation to virtual nodes, and, for the tasks allocated to the virtual nodes, computing the absolute earliest start time and the absolute latest start time by using data communication time between the tasks.

4. The task allocation method according to claim 1, further comprising:
when there are plural tasks with the smallest task movable range, selecting a task which has a longest task-to-task communication time between the task and a descendant task,
grouping the selected task and the descendant task dependent on each other;
computing the task movable range on a group by group basis; and
determining a destination node to which a group of tasks is allocated, giving priority to a group with a smaller task movable range.

5. A task allocation apparatus for allocating a plurality of tasks, which include those that are dependent on each other, to respective nodes in communication with one another in a distributed processing system, each node provided with at least one processor, the apparatus comprising:
a task antecedent dependency obtaining unit operating to determine antecedent dependency between the tasks;
a time constraint obtaining unit operating to determine a time constraint imposed on the tasks;
a start time computing unit operating to compute an absolute earliest start time at which at least one of the tasks can be started and an absolute latest start time which is allowed in order to complete the at least one task within the time constraint, based on the dependency between the tasks and the time constraint;

a node selector operating to allocate a target task to a destination node among the nodes of the distributed processing system based on a task movable range, which is defined as a subtraction of the absolute earliest start time from the absolute latest start time and by giving priority to a group with a smaller task movable range wherein the node selector is operating to select a node, giving priority to a target task with a smaller task movable range, the smaller task movable range is based on a difference between the absolute earliest start time and the absolute latest start time and the node selector further operates to select the node, giving priority to a target task having a longer virtual data communication time with a precedent or descendant task, if a plurality of target tasks exhibit same task movable range; and a task placement unit operating to place the target task with a longer virtual data communication time with the selected node;

wherein, if a plurality of target tasks have a same data communication time to communicate with the descendant task, the node selector is operating to allocate the target task to the destination node on a priority basis based on the absolute earliest start time of a most important descendant task descendant from the target task, the most important descendant task being a task with the smallest absolute earliest start time.

6. The task allocation apparatus according to claim 5, further comprising:
an advance designation acknowledging unit operating to acknowledge a designation of the destination node to which at least a part of the tasks should be accommodated,
wherein the node selector is operating to give priority to allocating the at least part of the tasks to the designated node, before selecting destination nodes to which the rest of the tasks are allocated.

7. The task allocation apparatus according to claim 5, wherein the node selector is operating to allocate the target task and the descendant task to the same destination node on a priority basis.

8. The task allocation apparatus according to claim 6, wherein the node selector includes an idle time detector operating to determine whether it is possible to allocate a target task to a node where one or more tasks are already allocated.

9. The task allocation apparatus according to claim 8, wherein the idle time detector is operating to determine whether the target task can be allocated to the node by delaying the absolute earliest start time of a task already allocated to the node.

10. The task allocation apparatus according to claim 6, wherein:
the node selector includes a grouping unit operating to, when there are plural target tasks with the smallest task movable range, group one or more of the target tasks which have a longest task-to-task communication time between the target task and a descendant task,
the start time computing unit is operating to compute the absolute earliest start time and the absolute latest start time on a group-by-group basis, and
the node selector is operating to select a destination node on a group-by-group basis and to allocate all tasks within the group to the selected destination node.

11. The task allocation apparatus according to claim 10, wherein the advance designation acknowledging unit is operating to acknowledge a designation to group a plurality of tasks, and the grouping unit is operating to group the tasks according to the designation.

12. A non-transitory storage medium containing a task allocation program that is executable on one or more processors communicating in a distributed processing system, the system including a plurality of nodes each provided with at least one of the processors, the storage medium comprising:

a first computing module which computes an absolute earliest start time at which at least one task from a group of tasks can be started and an absolute latest start time which is allowed in order to complete the at least one task within a time constraint imposed on the tasks;

a second computing module which computes a task movable range based on a subtraction of the absolute earliest start time from the absolute latest start time for the at least one task;

a determining module which allocates the at least one task to a destination node among the plurality of nodes, giving priority to tasks with smaller task movable ranges, wherein the determining module selects the destination node giving priority to the at least one task selected from the tasks with smaller task movable ranges computed as differences between absolute earliest start times of the tasks and respective absolute latest start times of the tasks and the determining module further operates to select the destination node by giving priority to the at least one task wherein the at least one task has a longer data communication time with a precedent or descendant task when all tasks with smaller task movable ranges exhibit a same task movable range and wherein, if a plurality of target tasks have a same data communication time to communicate with the descendant task, allocating the target task to the destination node on a priority basis based on the absolute earliest start time of a most important descendant task descendant from the target task, the most important descendant task being a task with the smallest absolute earliest start time.

* * * * *